United States Patent
Zhang et al.

(10) Patent No.: US 11,232,249 B2
(45) Date of Patent: Jan. 25, 2022

(54) METHOD FOR DETERMINING CURVILINEAR PATTERNS FOR PATTERNING DEVICE

(71) Applicant: ASML NETHERLANDS B.V., Veldhoven (NL)

(72) Inventors: Quan Zhang, San Jose, CA (US); Been-Der Chen, Milpitas, CA (US); Rafael C. Howell, Santa Clara, CA (US); Jing Su, Fremont, CA (US); Yi Zou, Foster City, CA (US); Yen-Wen Lu, Saratoga, CA (US)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 16/976,492

(22) PCT Filed: Feb. 28, 2019

(86) PCT No.: PCT/EP2019/055067
§ 371 (c)(1),
(2) Date: Aug. 28, 2020

(87) PCT Pub. No.: WO2019/179747
PCT Pub. Date: Sep. 26, 2019

(65) Prior Publication Data
US 2021/0048753 A1 Feb. 18, 2021

Related U.S. Application Data

(60) Provisional application No. 62/645,155, filed on Mar. 19, 2018.

(51) Int. Cl.
*G06F 30/30* (2020.01)
*G03F 1/30* (2012.01)
(Continued)

(52) U.S. Cl.
CPC .............. *G06F 30/398* (2020.01); *G03F 1/36* (2013.01); *G03F 1/70* (2013.01); *G03F 7/70441* (2013.01);
(Continued)

(58) Field of Classification Search
CPC ......... G06F 2119/18; G06F 30/30–398; G06F 2111/00–20; G06F 2113/00–20;
(Continued)

(56) References Cited

U.S. PATENT DOCUMENTS

| 5,229,872 A | 7/1993 | Mumola |
| 6,046,792 A | 4/2000 | Van Der Werf et al. |

(Continued)

FOREIGN PATENT DOCUMENTS

| TW | 200705232 | 2/2007 |
| TW | 201743141 | 12/2017 |

OTHER PUBLICATIONS

Y. Granik et al., "Fast pixel-bask mask optimization for inverse lithography," J. Microlith., Microfab., Microsyst., vol. 5, No. 4, 2006 SPIE, 13 pages. (Year: 2006).*

(Continued)

*Primary Examiner* — Leigh M Garbowski
(74) *Attorney, Agent, or Firm* — Pillsbury Winthrop Shaw Pittman LLP

(57) ABSTRACT

A method to determine a curvilinear pattern of a patterning device that includes obtaining (i) an initial image of the patterning device corresponding to a target pattern to be printed on a substrate subjected to a patterning process, and (ii) a process model configured to predict a pattern on the substrate from the initial image, generating, by a hardware computer system, an enhanced image from the initial image, generating, by the hardware computer system, a level set image using the enhanced image, and iteratively determin-
(Continued)

ing, by the hardware computer system, a curvilinear pattern for the patterning device based on the level set image, the process model, and a cost function, where the cost function (e.g., EPE) determines a difference between a predicted pattern and the target pattern, where the difference is iteratively reduced.

20 Claims, 13 Drawing Sheets

(51) Int. Cl.
  *G03F 7/20* (2006.01)
  *G06F 30/398* (2020.01)
  *G03F 1/36* (2012.01)
  *G03F 1/70* (2012.01)
  *G06F 119/18* (2020.01)
(52) U.S. Cl.
  CPC .......... *G03F 7/705* (2013.01); *G03F 7/70191* (2013.01); *G03F 7/70325* (2013.01); *G06F 2119/18* (2020.01)
(58) Field of Classification Search
  CPC . G06F 2115/00–12; G06F 2117/00–12; G06F 2119/00–22; G03F 1/36; G03F 1/70; G03F 7/70441; G03F 7/70191; G03F 7/70325; G03F 7/705
  See application file for complete search history.

(56) References Cited

U.S. PATENT DOCUMENTS

| | | | | |
|---|---|---|---|---|
| 7,480,889 B2* | 1/2009 | Abrams | ............... | G06F 30/39 716/54 |
| 7,698,665 B2* | 4/2010 | Abrams | ............... | G03F 1/68 716/55 |
| 7,757,201 B2 | 7/2010 | Abrams et al. | | |
| 8,245,159 B2* | 8/2012 | Liu | ............... | G03F 1/36 716/50 |
| 8,339,484 B2* | 12/2012 | Ishiga | ............... | G06T 5/004 348/252 |
| 8,473,878 B2* | 6/2013 | Chow | ............... | G03F 1/36 716/55 |
| 8,584,056 B2* | 11/2013 | Chen | ............... | G03F 7/70083 716/53 |
| 8,683,396 B2* | 3/2014 | Hu | ............... | G03F 1/36 716/55 |
| 9,013,571 B2* | 4/2015 | Abe | ............... | G06T 7/155 348/79 |
| 9,310,674 B2* | 4/2016 | Azpiroz | ............... | G03F 1/76 |
| 10,657,213 B2* | 5/2020 | Ungar | ............... | G03F 7/705 |
| 10,909,294 B2* | 2/2021 | Ungar | ............... | G03F 1/44 |
| 10,990,003 B2* | 4/2021 | Hsu | ............... | G03F 1/36 |
| 2007/0009808 A1 | 1/2007 | Abrams et al. | | |
| 2007/0011644 A1 | 1/2007 | Abrams et al. | | |
| 2007/0031745 A1 | 2/2007 | Ye et al. | | |
| 2007/0050749 A1 | 3/2007 | Ye et al. | | |
| 2008/0301620 A1 | 12/2008 | Ye et al. | | |
| 2008/0309897 A1 | 12/2008 | Wong et al. | | |
| 2009/0073413 A1 | 3/2009 | Abrams et al. | | |
| 2009/0157360 A1 | 6/2009 | Ye et al. | | |
| 2010/0162197 A1 | 6/2010 | Ye et al. | | |
| 2010/0180251 A1 | 7/2010 | Ye et al. | | |
| 2011/0022994 A1 | 1/2011 | Hu et al. | | |
| 2011/0230999 A1 | 9/2011 | Chen et al. | | |
| 2012/0137260 A1 | 5/2012 | Pang | | |
| 2013/0139116 A1 | 5/2013 | Chow et al. | | |
| 2014/0189614 A1 | 7/2014 | Liu et al. | | |
| 2017/0038692 A1 | 2/2017 | Hsu et al. | | |
| 2017/0336713 A1 | 2/2017 | Balestrieri | | |
| 2017/0255112 A1 | 9/2017 | Van Leest et al. | | |
| 2017/0329235 A1 | 11/2017 | Hsu et al. | | |

OTHER PUBLICATIONS

C. Spence et al., "Manufacturing Challenges for Curvilinear Masks," Photomask Technology 2017, Proc. of SPIE vol. 10451, 9 pages. (Year: 2017).*

International Search Report and Written Opinion issued in corresponding PCT Patent Application No. PCT/EP2019/055067, dated Jul. 3, 2019.

Pang L. et al.: "Considering MEEF in Inverse Lithography Technology (ILT) and Source Mask Optimization (SMO)", Proc. of SPIE, vol. 7122 (Jan. 1, 2008).

Pang L. et al.: "Optimization from Design Rules, Source and Mask, to Full Chip with a Single Computational Lithography Framework: Level-Set-Methods-Based Inverse Lithography Technology (ILT)", Proc. of SPIE, vol. 7640 (Mar. 2010).

Geng Z. et al.: "Regularized level-set-based inverse lithography algorithm for IC mask synthesis", Journal of Zhejiang University (2013).

Shen Y. et al.: "Level-set-based inverse lithography for photomask synthesis", Optics Express, vol. 17, No. 26 (Dec. 21, 2009).

Hsu, S. et al.: "An Innovative Source-Mask Co-Optimization (SMO) Method for Extending Low k1 Imaging", Proc. of SPIE, vol. 7140 (Dec. 4, 2008).

Hsu, S. et al.: "Source-Mask Co-optimization: Optimize Design for Imaging and Impact of Source Complexity on Lithography Performance", Proc. of SPIE, vol. 7520 (Dec. 10, 2009).

Chung N. et al.: "'Smart' source, mask, and target co-optimization to improve design related lithographically weak spots", Proc. of SPIE, vol. 9053 (Mar. 28, 2014).

Zhang, D. et al.: "Comparing Curvilinear vs Manhattan ILT Shape Efficacy on EPE and Process Window", Proc. of SPIE, vol. 9985 (2016).

Yenikaya, B.: "Full chip hierarchical inverse lithography: a solution with perfect symmetry", Proc. of SPIE, vol. 10147 (Mar. 24, 2017).

Jun, J. et al.: "Cost effective solution using inverse lithography OPC for DRAM random contact layer", Proc. of SPIE, vol. 10148 (Apr. 4, 2017).

Klein, C. et al.: "MBMW-101: World's 1$^{st}$ High-throughput Multi-Bean Mask Writer", Proc. of SPIE, vol. 9985 (2016).

Search Report issued in corresponding Taiwanese Patent Application No. 109138273, dated Nov. 4, 2021.

* cited by examiner

700

750

METHOD FOR DETERMINING CURVILINEAR PATTERNS FOR PATTERNING DEVICE

CROSS-REFERENCE TO RELATED APPLICATIONS

This application is the U.S. national phase entry of PCT Patent Application No. PCT/EP2019/055067, which was filed on Feb. 28, 2019, which claims the benefit of priority of U.S. Patent Application No. 62/645,155, which was filed on Mar. 19, 2018, and which is incorporated herein in its entirety by reference.

TECHNICAL FIELD

The description herein relates generally to mask manufacturing and patterning process. More particularly, an apparatus or a method for a determining patterning device patterns for a design layout.

BACKGROUND

A lithographic projection apparatus can be used, for example, in the manufacture of integrated circuits (ICs). In such a case, a patterning device (e.g., a mask) may contain or provide a pattern corresponding to an individual layer of the IC ("design layout"), and this pattern can be transferred onto a target portion (e.g. comprising one or more dies) on a substrate (e.g., silicon wafer) that has been coated with a layer of radiation-sensitive material ("resist"), by methods such as irradiating the target portion through the pattern on the patterning device. In general, a single substrate contains a plurality of adjacent target portions to which the pattern is transferred successively by the lithographic projection apparatus, one target portion at a time. In one type of lithographic projection apparatuses, the pattern on the entire patterning device is transferred onto one target portion in one go; such an apparatus is commonly referred to as a stepper. In an alternative apparatus, commonly referred to as a step-and-scan apparatus, a projection beam scans over the patterning device in a given reference direction (the "scanning" direction) while synchronously moving the substrate parallel or anti-parallel to this reference direction. Different portions of the pattern on the patterning device are transferred to one target portion progressively. Since, in general, the lithographic projection apparatus will have a reduction ratio M (e.g., 4), the speed F at which the substrate is moved will be 1/M times that at which the projection beam scans the patterning device. More information with regard to lithographic devices as described herein can be gleaned, for example, from U.S. Pat. No. 6,046,792, incorporated herein by reference.

Prior to transferring the pattern from the patterning device to the substrate, the substrate may undergo various procedures, such as priming, resist coating and a soft bake. After exposure, the substrate may be subjected to other procedures ("post-exposure procedures"), such as a post-exposure bake (PEB), development, a hard bake and measurement/inspection of the transferred pattern. This array of procedures is used as a basis to make an individual layer of a device, e.g., an IC. The substrate may then undergo various processes such as etching, ion-implantation (doping), metallization, oxidation, chemo-mechanical polishing, etc., all intended to finish off the individual layer of the device. If several layers are required in the device, then the whole procedure, or a variant thereof, is repeated for each layer. Eventually, a device will be present in each target portion on the substrate. These devices are then separated from one another by a technique such as dicing or sawing, whence the individual devices can be mounted on a carrier, connected to pins, etc.

Thus, manufacturing devices, such as semiconductor devices, typically involves processing a substrate (e.g., a semiconductor wafer) using a number of fabrication processes to form various features and multiple layers of the devices. Such layers and features are typically manufactured and processed using, e.g., deposition, lithography, etch, chemical-mechanical polishing, and ion implantation. Multiple devices may be fabricated on a plurality of dies on a substrate and then separated into individual devices. This device manufacturing process may be considered a patterning process. A patterning process involves a patterning step, such as optical and/or nanoimprint lithography using a patterning device in a lithographic apparatus, to transfer a pattern on the patterning device to a substrate and typically, but optionally, involves one or more related pattern processing steps, such as resist development by a development apparatus, baking of the substrate using a bake tool, etching using the pattern using an etch apparatus, etc.

As noted, lithography is a central step in the manufacturing of device such as ICs, where patterns formed on substrates define functional elements of the devices, such as microprocessors, memory chips, etc. Similar lithographic techniques are also used in the formation of flat panel displays, micro-electro mechanical systems (MEMS) and other devices.

As semiconductor manufacturing processes continue to advance, the dimensions of functional elements have continually been reduced while the amount of functional elements, such as transistors, per device has been steadily increasing over decades, following a trend commonly referred to as "Moore's law". At the current state of technology, layers of devices are manufactured using lithographic projection apparatuses that project a design layout onto a substrate using illumination from a deep-ultraviolet illumination source, creating individual functional elements having dimensions well below 100 nm, i.e. less than half the wavelength of the radiation from the illumination source (e.g., a 193 nm illumination source).

This process in which features with dimensions smaller than the classical resolution limit of a lithographic projection apparatus are printed, is commonly known as low-$k_1$ lithography, according to the resolution formula $CD=k_1\times\lambda/NA$, where $\lambda$ is the wavelength of radiation employed (currently in most cases 248 nm or 193 nm), NA is the numerical aperture of projection optics in the lithographic projection apparatus, CD is the "critical dimension"—generally the smallest feature size printed—and $k_1$ is an empirical resolution factor. In general, the smaller $k_1$ the more difficult it becomes to reproduce a pattern on the substrate that resembles the shape and dimensions planned by a designer in order to achieve particular electrical functionality and performance. To overcome these difficulties, sophisticated fine-tuning steps are applied to the lithographic projection apparatus, the design layout, or the patterning device. These include, for example, but not limited to, optimization of NA and optical coherence settings, customized illumination schemes, use of phase shifting patterning devices, optical proximity correction (OPC, sometimes also referred to as "optical and process correction") in the design layout, or other methods generally defined as "resolution enhancement techniques" (RET). The term "projection optics" as used herein should be broadly interpreted as encompassing various types of optical systems, including refractive optics, reflective optics, apertures and catadioptric optics, for example. The term "projection optics" may also include components operating according to any of these design types for directing, shaping or controlling the projection beam of radiation, collectively or singularly. The term "projection optics" may include any optical component in the lithographic projection apparatus, no matter where the optical component is located on an optical path of the lithographic projection apparatus. Projection optics may include optical components for shaping, adjusting and/or projecting radiation from the source before the radiation passes the patterning device, and/or optical components for shaping, adjusting and/or projecting the radiation after the radiation passes the patterning device. The projection optics generally exclude the source and the patterning device.

SUMMARY

According to an embodiment, there is provided a method to determine a curvilinear pattern of a patterning device. The method includes obtaining (i) an initial image of the patterning device corresponding to a target pattern to be printed on a substrate subjected to a patterning process, and (ii) a process model configured to predict a pattern on the substrate from the initial image, generating, by a hardware computer system, an enhanced image from the initial image, generating, by the hardware computer system, a level set image using the enhanced image, and iteratively determining, by the hardware computer system, a curvilinear pattern for the patterning device based on the level set image, the process model, and a cost function, wherein the cost function determines a difference between a predicted pattern and the target pattern, wherein the difference is iteratively reduced.

In an embodiment, the generating the enhanced image includes selecting pixels with relatively low intensities compared to an average intensity of pixels throughout the initial image, amplifying intensities of the selected pixels of the initial image, and combining the intensities of the selected pixels with the intensities of pixels in the initial image to generate the enhanced image.

In an embodiment, the amplifying intensities of the pixels of the initial image is based on an image based operation such as an edge detection filter, anti-bluring, averaging, and/or feature extraction or other similar operations.

In an embodiment, the selected pixels correspond to a first order, a second order, a third order and/or other higher order sub-resolution assist feature, wherein the second order sub-resolution assist feature is an assist feature located at a greater distance from features corresponding to the target pattern than a first order sub-resolution feature.

In an embodiment, wherein the generation of the enhanced image further includes filtering out noise from the enhanced image; and performing a smoothing operation on the enhanced image.

In an embodiment, the generating of curvilinear mask patterns includes converting the enhanced image to level set function/image, and tracing a contour on a threshold plane that intersects the level set function, the contour corresponding to the curvilinear pattern.

In an embodiment, an iteration of determining the curvilinear pattern includes modifying mask variables corresponding to the level set image, determining a gradient of the cost function, and optimizing the values of the mask variables of the level set image based on the gradient of the cost function such that the cost function is reduced.

In an embodiment, the cost function is minimized.

In an embodiment, the cost function includes edge placement error, sidelobe printing penalty, and/or a mask rule check violation penalty. A penalty may be a term of the cost function depends on a violation amount, e.g., a difference between a mask measurement and a given MRC or mask parameter (for example, a mask pattern width and allowed (e.g., minimum or maximum) mask width). Including the penalty term in the cost function allows reducing (in an embodiment, minimizing) such difference.

In an embodiment, the method further includes performing, by the hardware computer system, a patterning step using the curvilinear mask to print patterns on the substrate via the patterning process.

In an embodiment, the initial image is a continuous transmission mask image comprising features corresponding to the target pattern and assist features.

In an embodiment, the method further includes manufacturing the patterning device including structural features corresponding to the curvilinear pattern.

In an embodiment, the structural features correspond to optical proximity corrections including assist features and/or contour modification.

In an embodiment, the method further includes transferring, via a lithographic apparatus, the curvilinear pattern of the patterning device to the substrate.

Furthermore, according to an embodiment, there is provided a method determine a curvilinear pattern of a patterning device. The method includes obtaining (i) an initial image of the patterning device corresponding to a target pattern to be printed on a substrate subjected to a patterning process, and (ii) a process model configured to predict a pattern on the substrate from the initial image, generating, by the hardware computer system, a transformed image by applying a binary transformation (e.g., using a sigmoid or other binarization functions) from the initial image as continuous mask image, and iteratively determining, by the hardware computer system, a curvilinear pattern for the patterning device based on the transformed image, the process model, and a cost function, wherein the cost function determines a difference between a predicted pattern and the target pattern, wherein the difference is iteratively reduced.

In an embodiment, an iteration of determining the curvilinear pattern includes modifying mask variables corresponding to the initial image of the transformed image, determining a gradient of the cost function, and determining values of the mask variables of the level set image based on the gradient of the cost function such that the cost function is reduced.

In an embodiment, the cost function is minimized.

In an embodiment, the cost function includes an edge placement error, sidelobe printing penalty, and/or a mask rule check violation penalty.

In an embodiment, the method further includes performing, by the hardware computer system, a patterning step using the curvilinear mask to print patterns on the substrate via the patterning process.

In an embodiment, the method further includes generating, by a hardware computer system, an enhanced image from the initial image, generating, by the hardware computer system, a transformed image by applying a binary transformation to the enhanced image as continuous mask image, and iteratively determining, by the hardware computer system, a curvilinear pattern for the patterning device based on the transformed image, the process model, and a cost function, wherein the cost function determines a difference between a predicted pattern and the target pattern, wherein the difference is iteratively reduced.

In an embodiment, the binary transformation is performed by a logistic function, a step function, and/or a sigmoid function.

In an embodiment, the initial image is a continuous transmission mask image comprising features corresponding to the target pattern and sub-resolution assist features.

In an embodiment, the method further includes manufacturing the patterning device including structural features corresponding to the curvilinear pattern.

Furthermore, according to an embodiment, there is provided a computer program product comprising a non-transitory computer readable medium having instructions recorded thereon, the instructions when executed by a computer implementing the methods listed in above claims.

DETAILED DESCRIPTION

Figure 1:
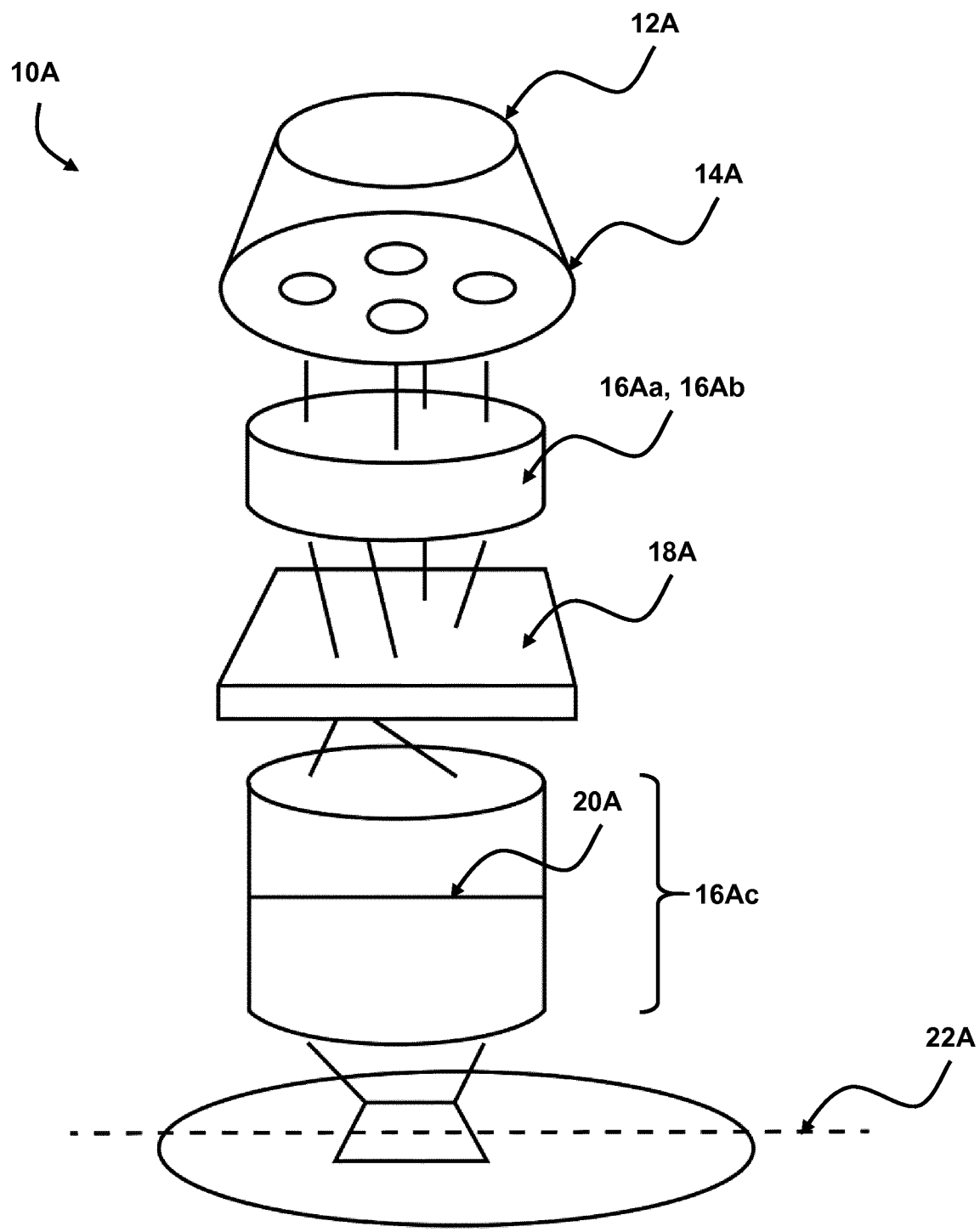
FIG. 1 shows a block diagram of various subsystems of a lithography system.

Although specific reference may be made in this text to the manufacture of ICs, it should be explicitly understood that the description herein has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms "reticle", "wafer" or "die" in this text should be considered as interchangeable with the more general terms "mask", "substrate" and "target portion", respectively.

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The patterning device can comprise, or can form, one or more design layouts. The design layout can be generated utilizing CAD (computer-aided design) programs, this process often being referred to as EDA (electronic design automation). Most CAD programs follow a set of predetermined design rules in order to create functional design layouts/patterning devices. These rules are set by processing and design limitations. For example, design rules define the space tolerance between devices (such as gates, capacitors, etc.) or interconnect lines, so as to ensure that the devices or lines do not interact with one another in an undesirable way. One or more of the design rule limitations may be referred to as "critical dimension" (CD). A critical dimension of a device can be defined as the smallest width of a line or hole or the smallest space between two lines or two holes. Thus, the CD determines the overall size and density of the designed device. Of course, one of the goals in device fabrication is to faithfully reproduce the original design intent on the substrate (via the patterning device).

The term "mask" or "patterning device" as employed in this text may be broadly interpreted as referring to a generic patterning device that can be used to endow an incoming radiation beam with a patterned cross-section, corresponding to a pattern that is to be created in a target portion of the substrate; the term "light valve" can also be used in this context. Besides the classic mask (transmissive or reflective; binary, phase-shifting, hybrid, etc.), examples of other such patterning devices include:

a programmable mirror array. An example of such a device is a matrix-addressable surface having a viscoelastic control layer and a reflective surface. The basic principle behind such an apparatus is that (for example) addressed areas of the reflective surface reflect incident radiation as diffracted radiation, whereas unaddressed areas reflect incident radiation as undiffracted radiation. Using an appropriate filter, the said undiffracted radiation can be filtered out of the reflected beam, leaving only the diffracted radiation behind; in this manner, the beam becomes patterned according to the addressing pattern of the matrix-addressable surface. The required matrix addressing can be performed using suitable electronic means.
  a programmable LCD array. An example of such a construction is given in U.S. Pat. No. 5,229,872, which is incorporated herein by reference.

As a brief introduction, FIG. 1 illustrates an exemplary lithographic projection apparatus 10A. Major components are a radiation source 12A, which may be a deep-ultraviolet excimer laser source or other type of source including an extreme ultra violet (EUV) source (as discussed above, the lithographic projection apparatus itself need not have the radiation source), illumination optics which, e.g., define the partial coherence (denoted as sigma) and which may include optics 14A, 16Aa and 16Ab that shape radiation from the source 12A; a patterning device 18A; and transmission optics 16Ac that project an image of the patterning device pattern onto a substrate plane 22A. An adjustable filter or aperture 20A at the pupil plane of the projection optics may restrict the range of beam angles that impinge on the substrate plane 22A, where the largest possible angle defines the numerical aperture of the projection optics NA=n sin ($\Theta_{max}$), wherein n is the refractive index of the media between the substrate and the last element of the projection optics, and $\Theta_{max}$ is the largest angle of the beam exiting from the projection optics that can still impinge on the substrate plane 22A.

In a lithographic projection apparatus, a source provides illumination (i.e. radiation) to a patterning device and projection optics direct and shape the illumination, via the patterning device, onto a substrate. The projection optics may include at least some of the components 14A, 16Aa, 16Ab and 16Ac. An aerial image (AI) is the radiation intensity distribution at substrate level. A resist model can be used to calculate the resist image from the aerial image, an example of which can be found in U.S. Patent Application Publication No. US 2009-0157630, the disclosure of which is hereby incorporated by reference in its entirety. The resist model is related only to properties of the resist layer (e.g., effects of chemical processes which occur during exposure, post-exposure bake (PEB) and development). Optical properties of the lithographic projection apparatus (e.g., properties of the illumination, the patterning device and the projection optics) dictate the aerial image and can be defined in an optical model. Since the patterning device used in the lithographic projection apparatus can be changed, it is desirable to separate the optical properties of the patterning device from the optical properties of the rest of the lithographic projection apparatus including at least the source and the projection optics. Details of techniques and models used to transform a design layout into various lithographic images (e.g., an aerial image, a resist image, etc.), apply OPC using those techniques and models and evaluate performance (e.g., in terms of process window) are described in U.S. Patent Application Publication Nos. US 2008-0301620, 2007-0050749, 2007-0031745, 2008-0309897, 2010-0162197, and 2010-0180251, the disclosure of each which is hereby incorporated by reference in its entirety.

One aspect of understanding a lithographic process is understanding the interaction of the radiation and the patterning device. The electromagnetic field of the radiation after the radiation passes the patterning device may be determined from the electromagnetic field of the radiation before the radiation reaches the patterning device and a function that characterizes the interaction. This function may be referred to as the mask transmission function (which can be used to describe the interaction by a transmissive patterning device and/or a reflective patterning device).

The mask transmission function may have a variety of different forms. One form is binary. A binary mask transmission function has either of two values (e.g., zero and a positive constant) at any given location on the patterning device. A mask transmission function in the binary form may be referred to as a binary mask. Another form is continuous. Namely, the modulus of the transmittance (or reflectance) of the patterning device is a continuous function of the location on the patterning device. The phase of the transmittance (or reflectance) may also be a continuous function of the location on the patterning device. A mask transmission function in the continuous form may be referred to as a continuous tone mask or a continuous transmission mask (CTM). For example, the CTM may be represented as a pixelated image, where each pixel may be assigned a value between 0 and 1 (e.g., 0.1, 0.2, 0.3, etc.) instead of binary value of either 0 or 1. In an embodiment, CTM may be a pixelated gray scale image, where each pixel having values (e.g., within a range [−255, 255], normalized values within a range [0, 1] or [−1, 1] or other appropriate ranges).

The thin-mask approximation, also called the Kirchhoff boundary condition, is widely used to simplify the determination of the interaction of the radiation and the patterning device. The thin-mask approximation assumes that the thickness of the structures on the patterning device is very small compared with the wavelength and that the widths of the structures on the mask are very large compared with the wavelength. Therefore, the thin-mask approximation assumes the electromagnetic field after the patterning device is the multiplication of the incident electromagnetic field with the mask transmission function. However, as lithographic processes use radiation of shorter and shorter wavelengths, and the structures on the patterning device become smaller and smaller, the assumption of the thin-mask approximation can break down. For example, interaction of the radiation with the structures (e.g., edges between the top surface and a sidewall) because of their finite thicknesses ("mask 3D effect" or "M3D") may become significant. Encompassing this scattering in the mask transmission function may enable the mask transmission function to better capture the interaction of the radiation with the patterning device. A mask transmission function under the thin-mask approximation may be referred to as a thin-mask transmission function. A mask transmission function encompassing M3D may be referred to as a M3D mask transmission function.

According to an embodiment of the present disclosure, one or more images may be generated. The images includes various types of signal that may be characterized by pixel values or intensity values of each pixel. Depending on the relative values of the pixel within the image, the signal may be referred as, for example, a weak signal or a strong signal, as may be understood by a person of ordinary skill in the art. The term "strong" and "weak" are relative terms based on intensity values of pixels within an image and specific values of intensity may not limit scope of the present disclosure. In an embodiment, the strong and weak signal may be identified based on a selected threshold value. In an embodiment, the threshold value may be fixed (e.g., a midpoint of a highest intensity and a lowest intensity of pixel within the image. In an embodiment, a strong signal may refer to a signal with values greater than or equal to an average signal value across the image and a weak signal may refer to signal with values less than the average signal value. In an embodiment, the relative intensity value may be based on percentage. For example, the weak signal may be signal having intensity less than 50% of the highest intensity of the pixel (e.g., pixels corresponding to target pattern may be considered pixels with highest intensity) within the image. Furthermore, each pixel within an image may considered as a variable. According to the present embodiment, derivatives or partial derivative may be determined with respect to each pixel within the image and the values of each pixel may be determined or modified according to a cost function based evaluation and/or gradient based computation of the cost function. For example, a CTM image may include pixels, where each pixel is a variable that can take any real value.

Figure 2:
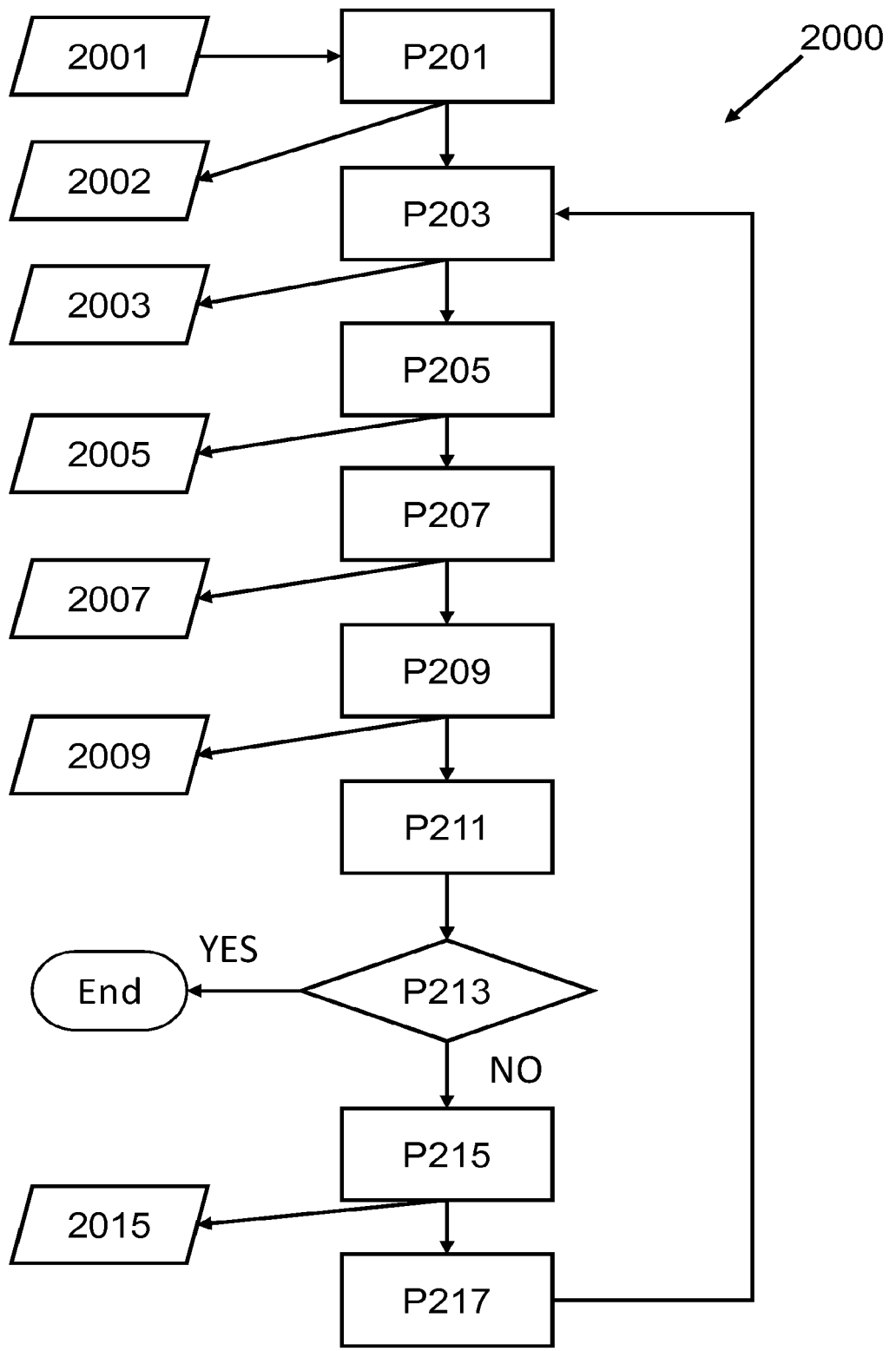
FIG. 2 is flow chart of a method for determining a patterning device pattern a target pattern to be printed on a substrate, according to an embodiment.

FIG. 2 is flow chart of a method 2000 for determining a patterning device pattern (or mask pattern, hereinafter) from an image (e.g., continuous transmission mask image, a binary mask image, a curvilinear mask image, etc.) corresponding to a target pattern to be printed on a substrate via a patterning process involving a lithographic process. In an embodiment, the design layout or the target pattern may be a binary design layout, a continuous tone design layout, or a design layout of another suitable form.

The method 2000 is an iterative process, where an initial image (e.g., enhanced image, level set image initialized from a CTM image, etc.) is progressively modified to generate different types of images according to different processes of the present disclosure to eventually generate an information of mask patterns or an image (e.g., a level set image corresponding to a final curvilinear mask) further used to fabricate/manufacture a mask. The iterative modification of the initial image may be based on a cost function, where during an iteration the initial image may be modified such that the cost function is reduced, in an embodiment, minimized. In an embodiment, the method 2000 may also be referred to as a CTM+ process, where an initial image is an optimized CTM image which is further processed according to the present disclosure to generate a curvilinear mask patterns (e.g., geometry or polygonal representation shapes of a curvilinear mask or curvilinear pattern). In an embodiment, the initial image may be the enhanced image of the CTM image). The curvilinear mask patterns may be in the form of a vector, a table, mathematical equations, or other forms of representing a geometric/polygonal shapes.

In an embodiment, process P201 may involve obtaining an initial image (e.g., a CTM image or an optimized CTM image, or a binary mask image). In an embodiment, initial image 2001 may be a CTM image generated by a CTM generation process based on a target pattern to be printed on a substrate. The CTM image may then be received by the process P201. In an embodiment, the process P201 may be configured to generate a CTM image. For example, in a CTM generation technique, an inverse lithography problem is formulated as an optimization problem. The variables are related to values of pixels in a mask image, and lithography metric such as EPE or sidelobe printings are used as cost function. In an iteration of the optimization, the mask image is constructed from the variables and then a process model (e.g., Tachyon model) is applied to obtain optical or resist images and cost functions are computed. The cost computation then gives the gradient values which are used in the optimization solver to update variables (e.g., pixel intensities). After several iterations during optimization, a final mask image is generated, which is further used as guidance map for pattern extraction (e.g., as implemented in Tachyon iOPC and SMO software). Such initial image (e.g., the CTM image) may include one or more features (e.g, a feature of a target pattern, SRAFs, Serifs, etc.) corresponding to the target pattern to be printed on the substrate via the patterning process.

In an embodiment, the CTM image (or an enhanced version of the CTM image) may be used to initialize the level set image (or level set function), which can be used as the initial image 2001, which is iteratively modified as discussed below.

Figure 3:
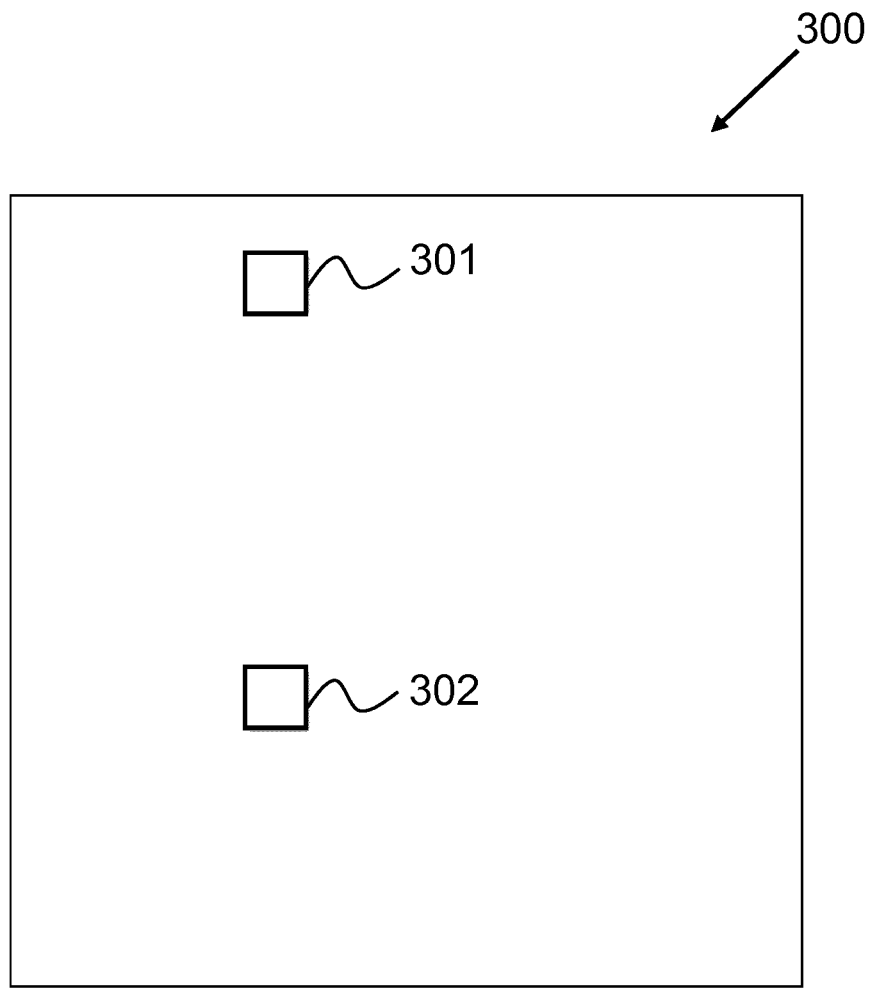
FIG. 3 illustrates a simple example of a target pattern, according to an embodiment.

In an embodiment, FIG. 3 illustrates a simple example of a target pattern 300 that includes contact holes 301 and 302 located at different locations on a substrate. Typically, a target pattern is much more complex including hundred and thousands or even millions of features of different sizes and shape located relatively close to each other. For such target pattern 300 a CTM image may be generated/obtained.

Figure 4A:
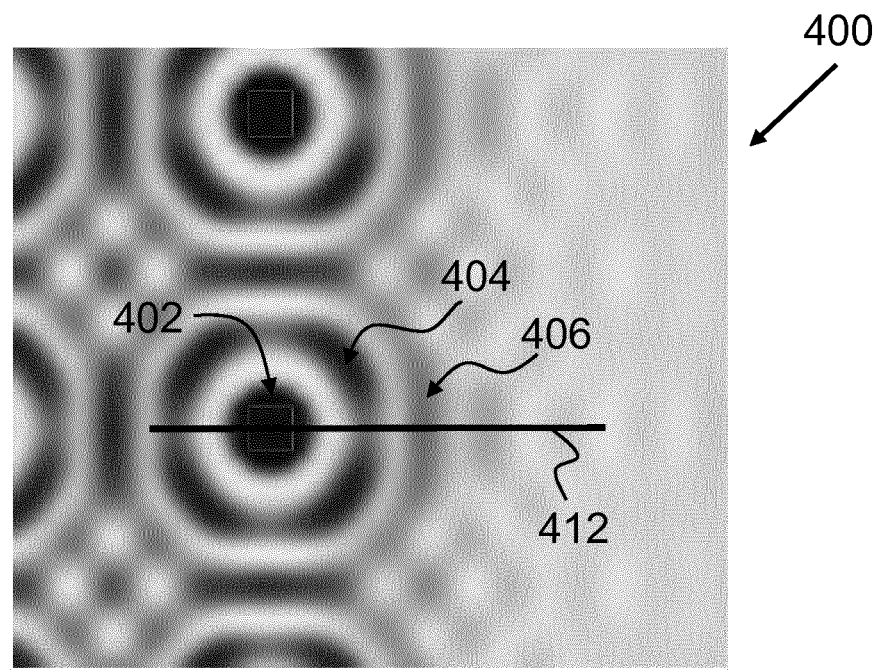
FIG. 4A illustrates an example CTM image corresponding to the target pattern, according to an embodiment.
Figure 4B:
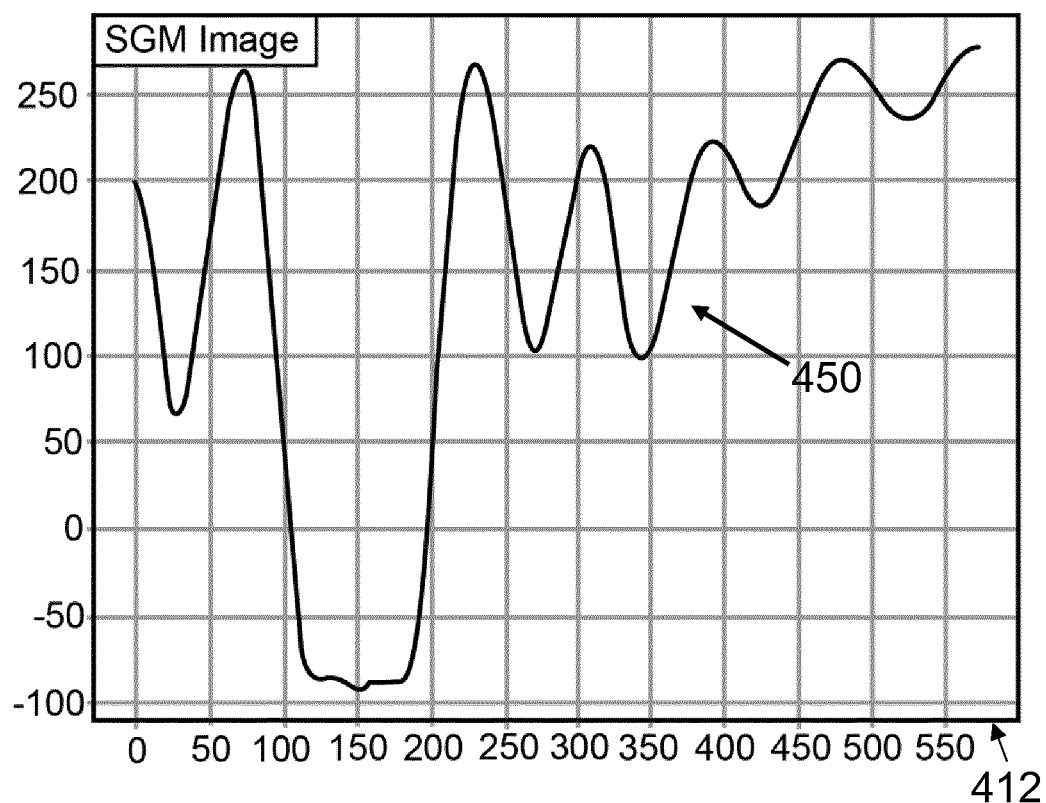
FIG. 4B illustrates an example of signal within the CTM image of FIG. 4A, according to an embodiment.

FIG. 4A is an example CTM image 400 (an example of initial image 2001) corresponding to the target pattern 300. The CTM image 400 includes a feature 402 corresponding to a target feature i.e., the contact hole 302 and additional features (e.g., SRAF 404) around the feature 402. In an embodiment, depending on a distance of an assist feature (e.g., SRAF) from the target feature, the assist feature may be referred as a first order, a second order, a third order and so on. For example, an SRAF may be referred as a first order SRAF (i.e., closest to the target pattern), a second order SRAF located after the first order SRAF, a third order SRAF located beyond the second order SRAF and so on. In an embodiment, the first order, second order, the third order SRAFs may be characterized by pixel values. In an embodiment, SRAFs close to the target may have higher intensity and the intensity may gradually reduce as the SRAF is located further away from the target pattern. In other words, within CTM image features (e.g., SRAFs) having progressively lower pixel values or weaker signals may be observed. According to an embodiment, as an example, away from target pattern, white region may indicate no signal (having no intensity) and black (or dark region) may indicate "signal" (having certain intensity). For example, the CTM image 400, a dark region indicates a strong signal and a white or grey region indicate relatively weak signal. For example, SRAF 404 (an example of a first order SRAF) may have relatively higher pixel values (or stronger signal) compared to SRAF 406 (an example of a second order SRAF). Beyond the SRAF 406, the signal further weakens, which may be ignored i.e., indicating no SRAF or other feature may be included within such regions. An example of signal along the line 412 passing through the contact hole 402 is illustrated in FIG. 4B. In FIG. 4B, a signal 450 may be considered strong (having large amplitudes with respect to, for example, 100 or large variation in amplitude) up to, for example, 350 nm and signal 450 may be progressively weaken (relatively small change in amplitude) after 350 nm.

In an embodiment, if a feature is within a target pattern, for example, within a relatively large target polygon, then white may indicate signal (e.g., to place a sub-resolution inverse feature (SRIF) while black may indicate no signal.

Furthermore, the process P201 may involve generating an enhanced image 2002 based on the initial image 2001. An enhanced image 2002 may be an image where certain selected pixels within the initial image 2001 are amplified. The selected pixels may be pixels having relatively lower values (or weak signals) within the initial image 2001. In an embodiment, the selected pixels be pixels having signal values lower than, for example, and average intensity of pixels throughout the initial image, or a given threshold value. In other words, pixels with weaker signals within the initial image 2001 are amplified, thus enhancing one or more features within the initial image 2001. For example, a second order SRAFs around a target feature may have a weak signal that may be amplified. Thus, the enhanced image 2002 may highlight or identify additional features (or structures) that may be included within a mask image (generated later on in the method). In a conventional method (e.g., CTM method) of determining a mask image, weak signals within an initial image may be ignored and as such, the mask image may not include features that may be formed from a weak signal in an initial image 2001.

The generation of the enhanced image 2002 involves applying an image processing operation such as a filter (e.g., an edge detection filter) to amplify weak signals within the initial image 2001. Alternatively or in addition, the image processing operation may be deblurring, averaging, and/or feature extraction or other similar operations. Examples of the edge detection filter include the Prewitt operator, Laplacian operator, Laplacian of Gaussian (LoG) filter and etc. The generation step may further involve combining the amplified signals of the initial image 2001 with original signals of the initial image 2001 with or without modifying the original strong signals of the initial image 2001. For example, in an embodiment, for one or more pixel values at one or more locations (e.g., at contact holes) across the initial image 2001, the original signal may be relatively strong (e.g., above a certain threshold such as 150 or below −50), then the original signal at the one or more locations (e.g., at contact holes) may not be modified or combined with the amplified signal for that location.

In an embodiment, noise (e.g., random variation in brightness or color or pixel values) in the initial image 2001 may also get amplified. So, alternatively or in addition, a smoothing process may be applied to reduce noise (e.g., random variation in brightness or color or pixel values) in the combined image. Examples of image smoothing methods include Gaussian blur, running average, low-pass filters and etc.

In an embodiment, the enhanced image 2002 may be generated using an edge detection filter. For example, an edge detection filter may be applied to the initial image 2001 to generate a filtered image that highlights edges of one or more features within an initial image 2001. The resulting filtered image may be further combined with the original image (i.e., the initial image 2001) to generate the enhanced image 2002. In an embodiment, the combining of the initial image 2001 and the image obtained after edge filtering may involve modifying only those parts of the initial image 2001 that have weak signals without modifying the regions having strong signals, and the combining process could be weighted based on signal strength. In an embodiment, amplifying of the weak signal may also amplify noise within the filtered image. Hence, according to an embodiment, a smoothing process may be performed on the combined image. A smoothing of an image may refer to an approximating function that attempts to capture important patterns (e.g., target pattern, SRAFs) in the image, while leaving out noise or other fine-scale structures/rapid phenomena. In smoothing, the data points of a signal may be modified so individual points (presumably because of noise) may be reduced, and points that may be lower than the adjacent points may be increased leading to a smoother signal or a smoother image. Thus, upon smoothing operation, the further smooth version of the enhanced image 2002 having reduced noise may be obtained, according to an embodiment of the present disclosure.

Figure 5A:
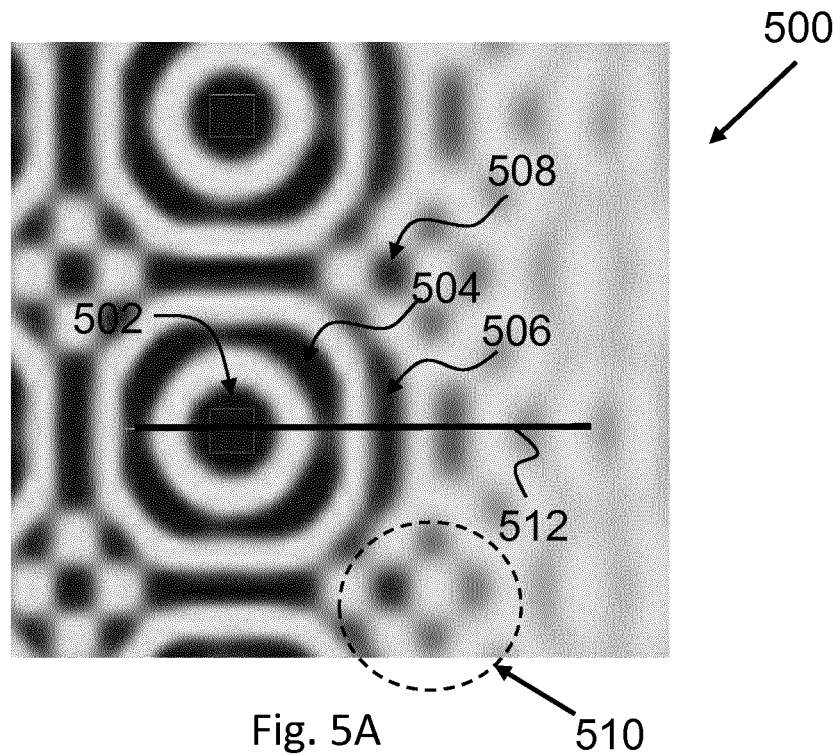
FIG. 5A illustrates an example enhanced image corresponding to the CTM image of FIG. 4A, according to an embodiment.
Figure 5B:
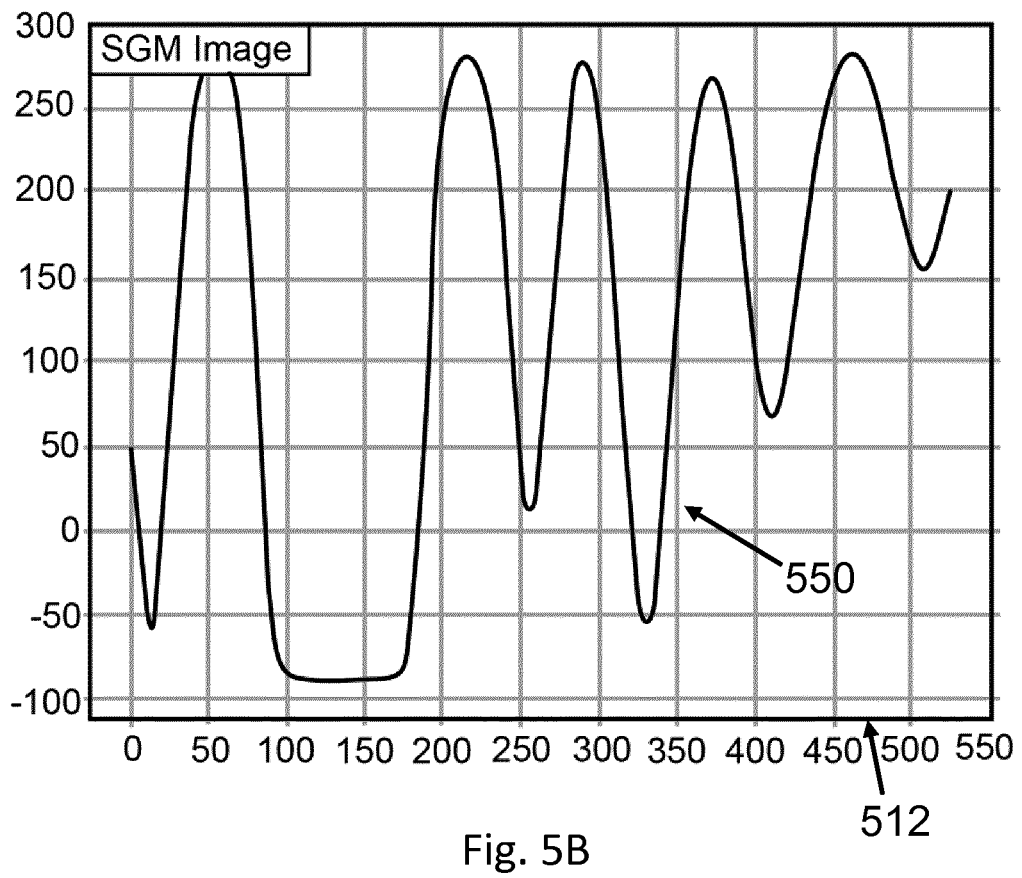
FIG. 5B illustrates an example of signal within the enhanced image of FIG. 5A, according to an embodiment.

FIG. 5A illustrates an example enhanced image 500 (an example of enhanced image 2002) generated from the initial CTM image 400. In the image 500, several features of the initial CTM image 400 are enhanced. For example, a contact hole 502 and a first SRAF 504 are more pronounced (e.g., in terms of intensity and edge sharpness) compared to the hole 402 and SRAF 404 in the initial CTM image 400. More importantly, second or higher order SRAF 506, 508 and/or 510, located away from the contact hole 502 and relatively farther from the first SRAF 504, have greater intensity (or stronger signal) compared that seen in the initial image 400. An example signal 550 along the line 512 (corresponding to the line 412 in the initial image 400) passing through the contact hole 502 is illustrated in FIG. 5B. In FIG. 5B, the signal 550 may be stronger than the signal 450. The signal 550 has relatively larger amplitudes (or variation in amplitude), for example, the signal 550 is relatively stronger than that seen in signal 450.

Figure 6A:
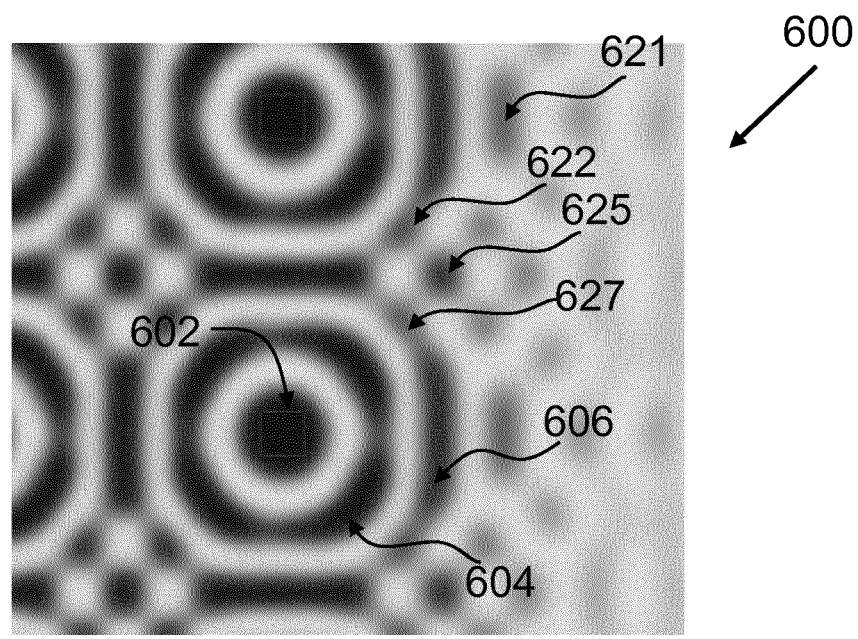
FIG. 6A illustrates a smooth version of the enhanced image of FIG. 5A, according to an embodiment.

In an embodiment, the enhanced image 500 may be further smoothen using a smoothing function, as discussed earlier, to generate a smoother version of the enhanced image 500. For example, FIG. 6A, illustrates a smooth enhanced image 600 generated from the enhanced image 500.

Further, the method, in process P203 may involve generating a level set image 2003 based on the enhanced image 2002. In first iteration, the enhanced image 2002 may be used to initialize the level set image 2003. In later iterations the level set image 2003 is updated iteratively.

A level set of a real-valued function $f$ of n real variables, is a set of the form:

$$L_c(f) = \{(x_1, x_2, \ldots, x_n) | f(x_1, x_2, \ldots, x_n) = c\}$$

In a two dimensional space, the set defines all the points on the surface at which the function $f$ equals to given value c, and a level set $L_c(f)$ is generically a curve, called a level curve, contour (e.g., a curvilinear shape), or isoline. In a two dimensional space, the level set function $f$ is denoted by $\emptyset$, which refers the level set image.

In the above equation, $f$ refers to a mask variables such as the intensity of each pixel, which determines the locations where the curvilinear mask edge exists with a given constant value c (e.g. a threshold plane as discussed in process P205 below).

In an embodiment, at an iteration, the generating of the level set image 2003 may involve modifying one or more values of variables (e.g., pixel values at one or more locations) within the enhanced image 2002 based on, for example, initialization conditions or a gradient map (which may be generated later on in the method). For example, the one or more pixel values may be increased or decreased. In other words, the amplitude of one or more signals within the enhanced image 2002 may be increased or decreased. Such modified amplitude of the signals enable generation of different curvilinear patterns depending on an amount of change in the amplitude of the signal (e.g., the signal 550). Thus, the curvilinear patterns gradually evolve till a cost function is reduced, in an embodiment, minimized. In an embodiment, further smoothing may be performed on the level set image 2003.

Furthermore, process P205 involves generating curvilinear mask patterns 2005 (e.g., having polygon shapes represented in a vector form) based on the level set image 2003. The generation of the curvilinear mask patterns 2005 may involve thresholding of the level set image 2003 to trace or generate curvilinear (or curved) patterns from the level set image 2003. For example, thresholding may be performed using a threshold plane (e.g., an x-y plane) having a fixed value which intersects the signals of the level set image 2003. The intersection of the threshold plane with the signals of the level set image 2003 generate tracings or outlines (i.e., curved polygon shapes) which form polygonal shapes that serve as the curvilinear patterns for the curvilinear mask patterns 2005. For example, the level set image 2003 may be intersected with the zero plane parallel to the (x,y) plane. Thus, the curvilinear mask patterns 2005 may be any curvilinear patterns generated as above. In an embodiment, the curvilinear patterns traced or generated from the level set image 2003 depend on the signals of the enhanced image 2002. For example, if a signal for the second order SRAF 506 (or 606) is not present in the enhanced image 2002, the curvilinear pattern may not generate polygon shapes corresponding to such SRAF 506 (or 606). As such, the image enhancement process P203 facilitates improvement in patterns generated for a final curvilinear mask patterns. The final curvilinear mask patterns may be further used by a mask manufacturer to fabricate a mask for use in a lithography process.

Figure 6B:
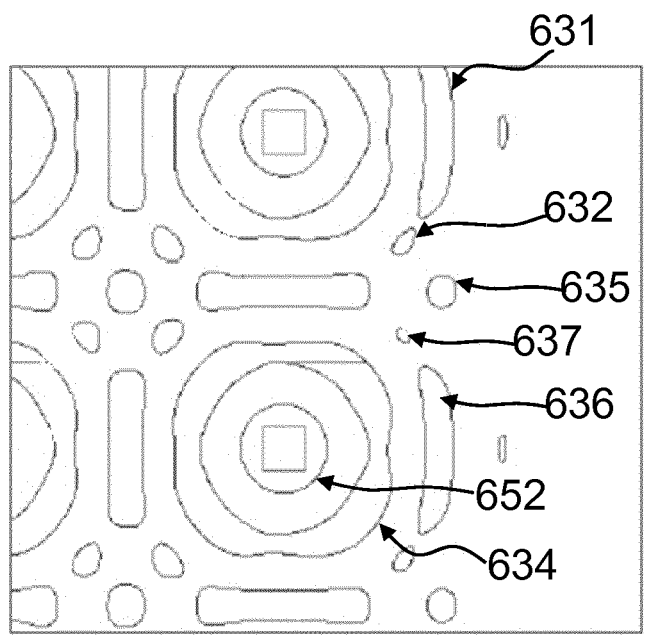
FIG. 6B illustrates an example initial curvilinear pattern corresponding to FIG. 6A or 5A, according to an embodiment.

FIGS. 6A and 6B illustrate an example of initial level set image 600 (an example of the level set image 2003) obtained from the enhanced image 500 and/or iterative updates to the initial image. From, the level set image 600, contours of different patterns including a target pattern, and SRAFs, are generated (e.g., using the thresholding process of P205). For example, the level set image 600 may comprise a contour 652 corresponding to a target pattern (i.e., the contact hole 302), a first SRAF contour 634 around the contour 652, and other second order or third order SRAF contours such as 631, 632, 635, 637, and 636, each such SRAF corresponding to a signal in the level set image 600, and/or in the enhanced image 500.

Furthermore, process P207 may involve rendering the curvilinear mask patterns 2005 to generate a mask image 2007. Rendering is a standard operation performed on the curvilinear mask patterns, which is a similar process as converting rectangle mask polygons into discrete grayscale image representation. Such process could be understood as sampling the box function of continuous coordinates (polygons) into values at each point of image pixels.

The method further involves a forward simulation of the patterning process using process models that generate or predict a pattern 2009 that may be printed on a substrate based on the mask image 2007. For example, process P209 may involve executing and/or simulating the process model using the mask image 2007 as input and generating a process image 2009 on the substrate (e.g., an aerial image, a resist image, etch image, etc.). In an embodiment, the process model may include a mask transmission model coupled to an optics model which is further coupled to a resist model and/or etch model. The output of the process model may be a process image 2009 that has factored in different process variations during the simulation process. The process image may be further used to determine parameters (e.g., EPE, CD, overlay, sidelobe, etc.) of the patterning process by, for example, tracing the contours of the patterns within the process image. The parameters may be further used to define a cost function, which is further used to optimize the mask image 2007 such that the cost function is reduced, or in an embodiment minimized.

In process P211, a cost function may be evaluated based on the process model image 2009 (also referred as a simulated substrate image or substrate image or wafer image). Thus, the cost function may be considered as process aware, where variations of the patterning process, enabling generation of a curvilinear mask patterns that accounts for variations in patterning process. For example, the cost function may be an edge placement error (EPE), sidelobe, a mean squared error (MSE) or other appropriate variable defined based on the contour of the patterns in the process image. An EPE may be an edge placement error associated with one or more patterns and/or a summation of all the edge placement errors related to all the patterns of the process model image 2009 and the corresponding target patterns. In an embodiment, the cost function may include more than one conditions that may be simultaneously reduced or minimized. For example, in addition to the MRC violation probability, the number of defects, EPE, overlay, CD or other parameter may be included and all the conditions may be simultaneously reduced (or minimized).

Furthermore, one or more gradient maps (discussed later) may be generated based on the cost function (e.g., EPE) and mask variables may be modified based on such gradient map(s). Mask variables (MV) refer to intensities of level set image $\emptyset$. Accordingly, the gradient computation may be represented as dEPE/d$\emptyset$, and the gradient values are updated by capturing the inverse mathematical relationship from the mask image (MI) to curvilinear mask polygons to level set image. Thus, a chain of derivative may be computed of the cost function with respect to the mask image, from the mask image to curvilinear mask polygon and from curvilinear mask polygon to level set image, which allows modification of the values of the mask variables at the level set image.

In an embodiment, image regularization may be added to reduce the complexity of the mask patterns that may be generated. Such image regularization may be mask rule checks (MRC). MRC refers to the limiting conditions of a mask manufacturing process or apparatus. Thus, the cost function may include different components, for example, based on EPE and MRC violation penalty. A penalty may be a term of the cost function that depends on a violation amount, e.g., a difference between a mask measurement and a given MRC or mask parameter (for example, a mask pattern width and an allowed (e.g., minimum or maximum) mask pattern width). Thus, according to an embodiment of the present disclosure, mask patterns may be designed and a corresponding mask may be fabricated not only based on forward simulation of the patterning process, but also additionally based on manufacturing limitations of the mask manufacturing apparatus/process. Thus, the manufacturable curvilinear mask producing high yield (i.e., minimum defects) and high accuracy in terms of, for example, EPE or overlay on the printed pattern may be obtained.

Ideally, the pattern corresponding to a process image should be exactly same as the target pattern, however, such exact target patterns may not feasible (for example, typically sharp corners) and some conflictions are introduced due to the variations in the patterning process itself and/or approximations in the models of the patterning process.

In first iteration of the method, the mask image 2007 may not generate a pattern (in the resist image) which is similar to the target pattern (e.g., target pattern 300). The determination of accuracy or acceptance of the printed pattern in the resist image (or etch image) may be based on the cost function such as EPE. For example, if the EPE of the resist pattern is high, it indicates that the printed pattern using the mask image 2007 is not acceptable and patterns in the level set image 2003 must be modified.

To determine whether a mask image 2007 is acceptable, process P213 may involve determining whether the cost function is reduced or minimized, or whether a given iteration number is reached. For example, an EPE value of a previous iteration may be compared with an EPE value of the current iteration to determine whether the EPE has reduced, minimized, or converged (i.e., no substantial improvement in printed pattern is observed). When the cost function is minimized, the method may stop and the curvilinear mask patterns information that is generated is considered as an optimized result.

However, if the cost function is not reduced or minimized, and the mask related variables or enhanced image related variable (e.g., pixel values) may be updated. In an embodiment, the updating may be based on gradient-based method. For example, if the cost function is not reduced, the method 2000 proceeds to a next iteration of generating the mask image after performing processes P215 and P217 that indicate how to further modifying the level set image 2003 or variables of the level set image (of the process P203).

The process P215 may involve generating a gradient map 2015 based on the cost function. The gradient map may be a derivative and/or a partial derivative of the cost function. In an embodiment the partial derivative of the cost function may be determined with respect pixels of the mask image and derivative may be further chained to determine partial derivative with respect to the variables of the level set image 2003. Such gradient computation may involve determining inverse relationships between the mask image 2007 to the level set image 2003. Furthermore, an inverse relationship of any smoothing operation (or function) performed in process P205 and P203 must be considered.

The gradient map 2015 may provide a recommendation about increasing or decreasing the values of the mask variables (i.e., values of the level set image or a CTM image) in a manner such that value of the cost function is reduced, in an embodiment, minimized. In an embodiment, an optimization algorithm may be applied to the gradient map 2015 to determine the mask variable values. In an embodiment, a optimization solver (for example second order solver Broyden-Fletcher-Goldfarb-Shanno, BFGS) may be used to perform gradient-based computation (in process P217).

Figure 7A:
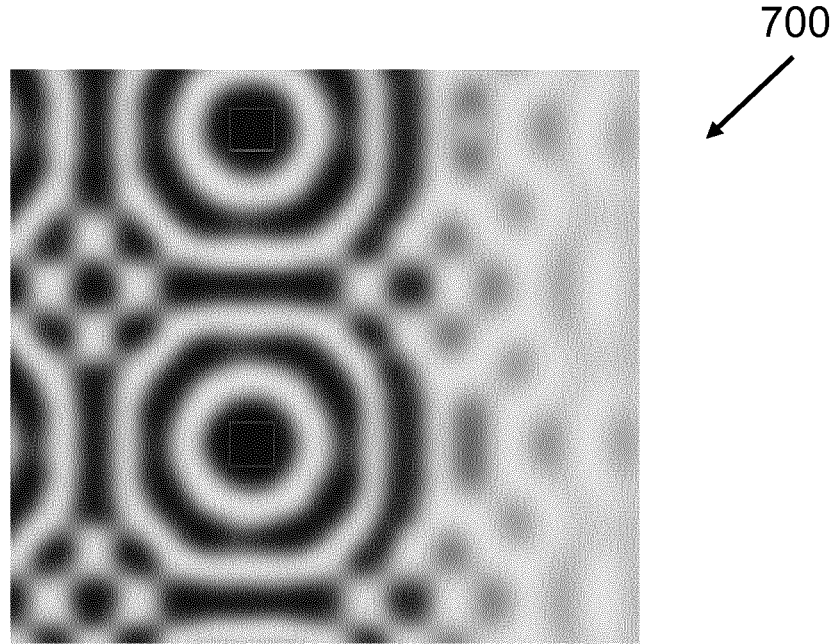
FIG. 7A illustrates an optimized level set image, according to an embodiment.
Figure 7B:
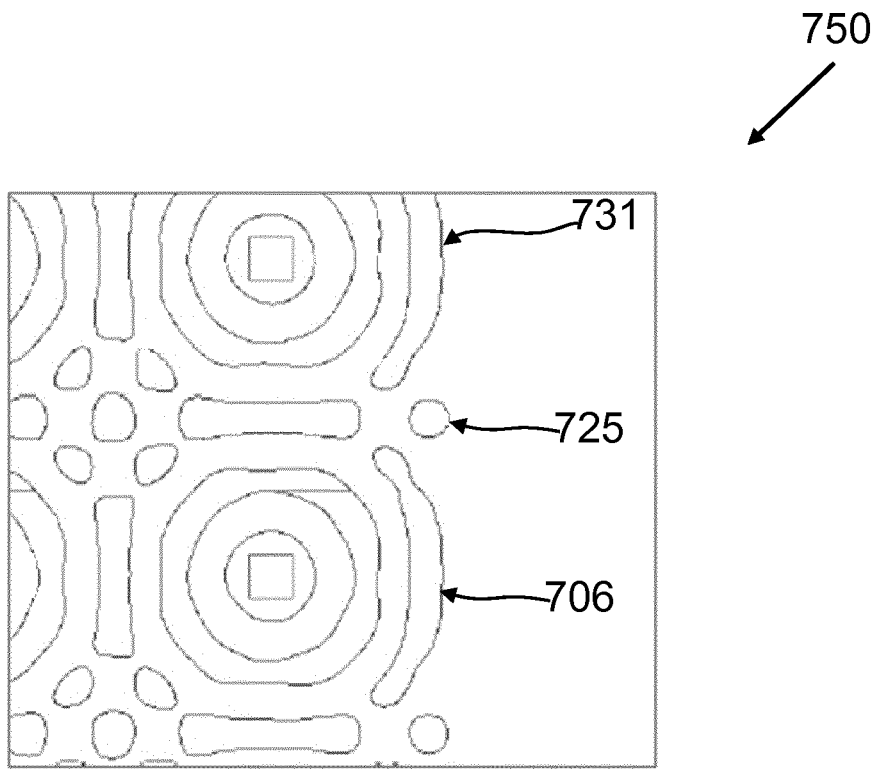
FIG. 7B illustrates a final curvilinear pattern corresponding the target pattern of FIG. 3, according to an embodiment.
Figure 8A:
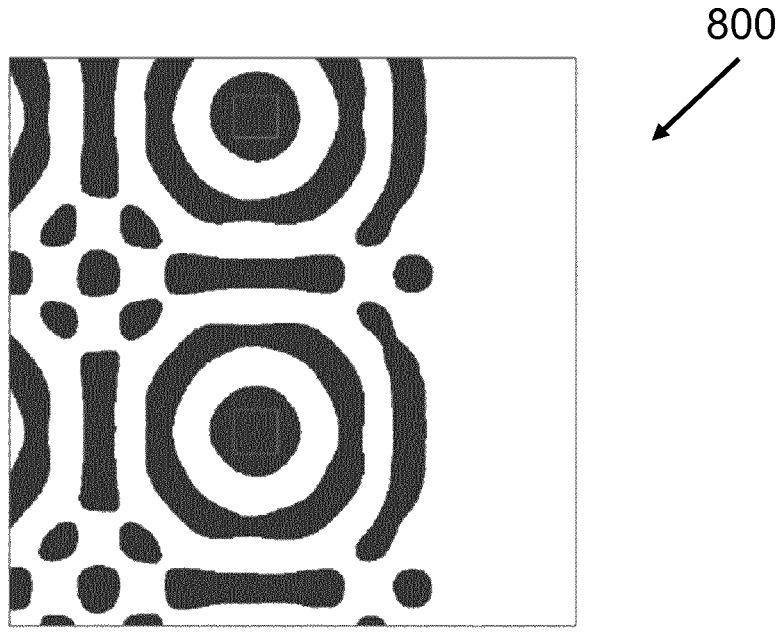
FIG. 8A illustrates an image 800 of the final curvilinear pattern of FIG. 7B with area of the patterns filled, according to an embodiment.
Figure 8B:
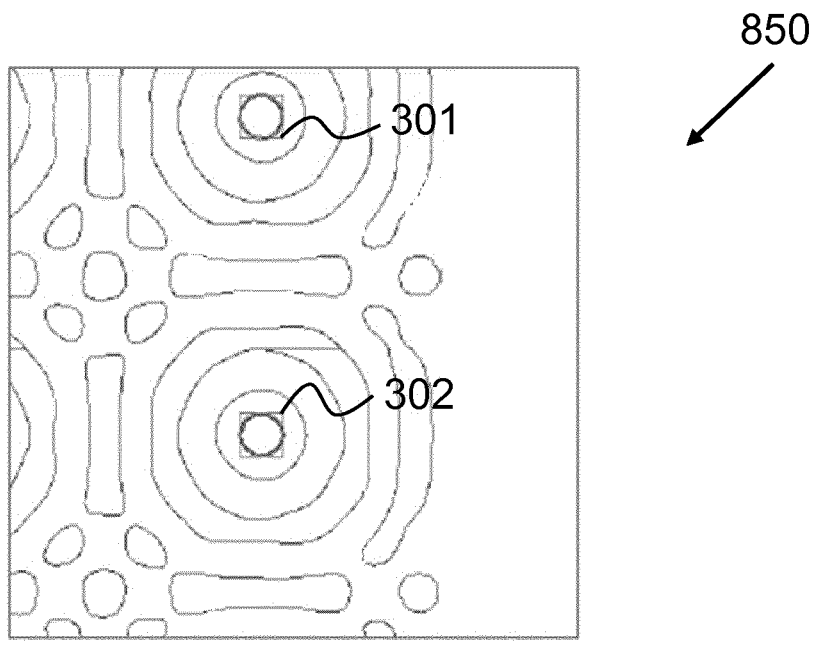
FIG. 8B illustrates contours 850 of the curvilinear pattern of FIG. 7B and the target pattern of FIG. 3, according to an embodiment.

In an embodiment, for an iteration, variables of the level set image may be changed while the threshold plane may remain fixed or unchanged in order to gradually reduce or minimize the cost function. Thus, the curvilinear patterns generated may gradually evolve during an iteration such that the cost function is reduced, or in an embodiment, minimized. In another embodiment, the variables of the level set image as well as the threshold plane may both change to achieve faster convergence of the optimization process. Upon several iterations and/or minimization of the cost function may result in final set of CTM+ results (i.e., a modified version of the enhanced image, level set image, or curvilinear mask). For example, FIG. 7A illustrates a final level set image 700 and a corresponding pictorial representation of curvilinear mask patterns 750 (in FIG. 7B) that includes polygon shapes, for example, SRAFs 731, 725, and 706, which are a result of progressive distortions of the SRAFs in the initial enhanced image 500 or the initial level set image 600.

In an embodiment of the present disclosure, the transition from CTM optimization with grayscale image to CTM+ optimization with curvilinear mask may be simplified by replacing the level set process and the thresholding process (i.e. P203 and P205) by a different process where a sigmoid transformation is applied to the enhanced image 2002 and corresponding change in gradient computation is performed. The sigmoid transformation of the enhanced image 2002 generates a transformed image that gradually evolve into a curvilinear pattern during an optimization process (e.g., minimizing cost function). During an iteration or a step of optimization, variables (e.g., steepness and/or a threshold) related to sigmoid function may be modified based on the gradient computation. As the sigmoid transformation becomes sharper (e.g., increase in steepness of the slope of the sigmoid transformation) in successive iterations, a gradual transition from the CTM image to a final CTM+ image may be achieved allowing improved results in the final CTM+ optimization with curvilinear mask patterns.

In an embodiment of the present disclosure, additional steps/process may be inserted into the loop of an iteration of the optimization, to enforce the result to have selected or desired properties. For example, smoothness may be ensured by adding a smoothing step, or other filter may be used to enforce image to favor horizontal/vertical structures.

The present method has several features or aspect. For example, using optimized CTM mask image with image enhancement methods to improve the signal which is further used as seeding in an optimization flow. In another aspect, use of the level set method with the CTM technique (referred as CTM+) enables generation of curvilinear mask patterns. In yet another aspect, a full formulation (i.e., a closed loop formulation) of gradient computation allows using Hessian based (2nd order) solver for level set optimization. The CTM+ results may be used as local solution (as hotspot repair) or used as full chip solution. The CTM+ results may be used together with machine learning as input, and also this allows possibility to use machine learning to speed up CTM+. In yet another aspect, the method includes image regularization methods to improve the results. In another aspect, the method involves successive optimization stages to achieve more smooth transition from grayscale image CTM to binary curvilinear mask CTM+. The method allowing tuning the threshold of optimization to improve results. The method includes additional transformation into an iteration of optimization to enforce good property of results (require smoothness in CTM+ image).

As lithography node keeps shrinking, it requires more and more complicated masks. With the recent breakthrough of multi-e-beam writer (by IMS), it is believed that fully curvilinear mask, at least according to the present disclosure, may be used in key layers with DUV scanner, EUV scanner, and/or other scanners.

The method according to the present disclosure may be included in different aspect of mask optimization process include source mask optimization, mask optimization, and/or OPC and appropriate curvilinear mask pattern may be determined.

Figure 9:
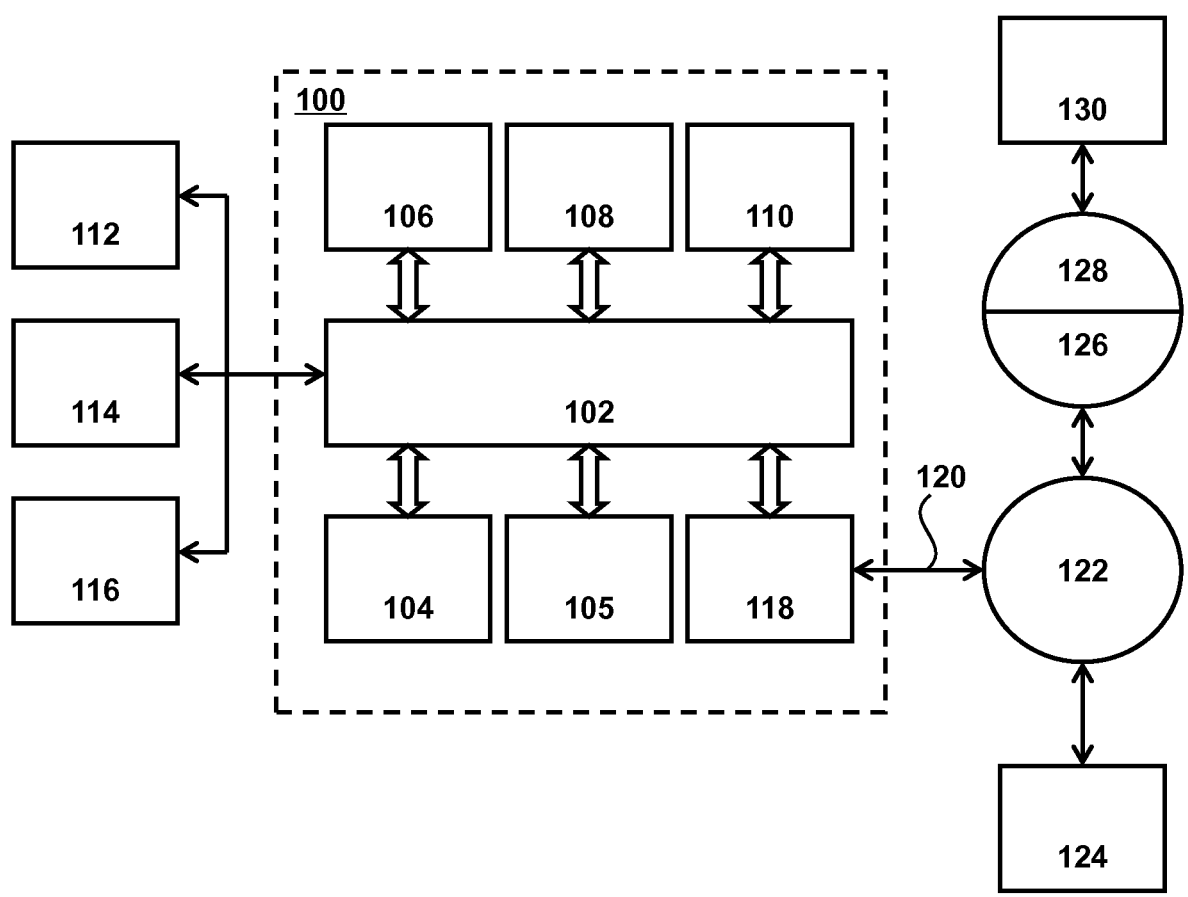
FIG. 9 is a block diagram of an example computer system, according to an embodiment.

FIG. 9 is a block diagram that illustrates a computer system 100 which can assist in implementing the methods, flows or the apparatus disclosed herein. Computer system 100 includes a bus 102 or other communication mechanism for communicating information, and a processor 104 (or multiple processors 104 and 105) coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

According to one embodiment, portions of one or more methods described herein may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In an alternative embodiment, hard-wired circuitry may be used in place of or in combination with software instructions. Thus, the description herein is not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 may also include a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. One such downloaded application may provide all or part of a method described herein, for example. The received code may be executed by processor 104 as it is received, and/or stored in storage device 110, or other non-volatile storage for later execution. In this manner, computer system 100 may obtain application code in the form of a carrier wave.

Figure 10:
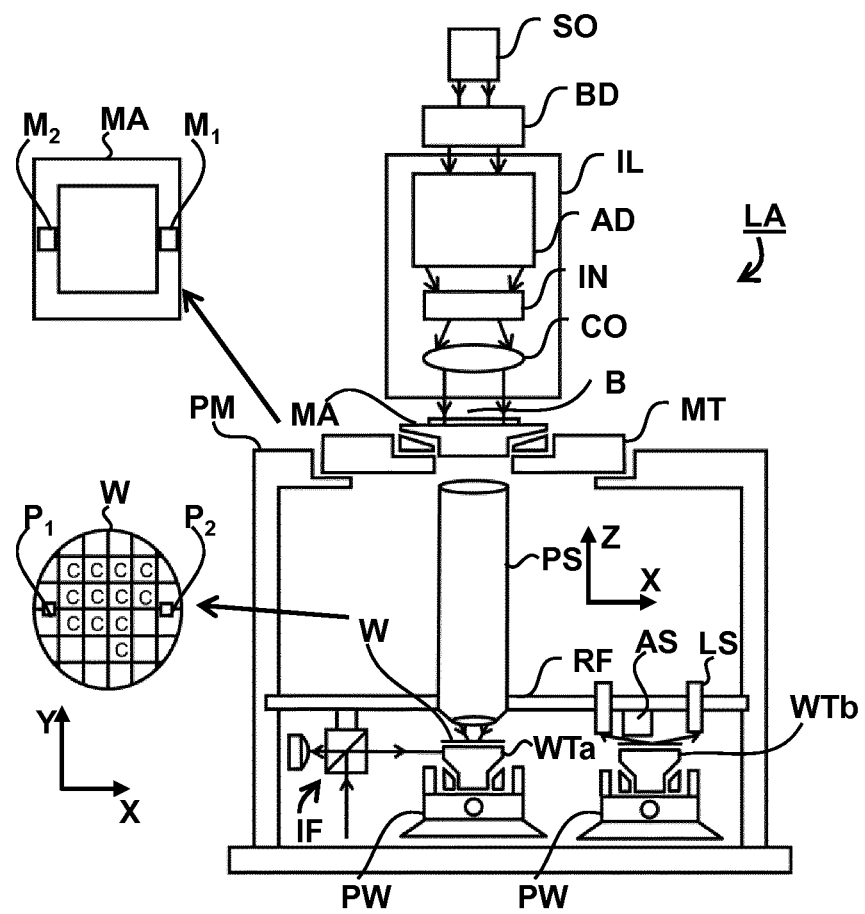
FIG. 10 is a schematic diagram of a lithographic projection apparatus, according to an embodiment.

FIG. 10 schematically depicts an exemplary lithographic projection apparatus in conjunction with the techniques described herein can be utilized. The apparatus comprises:
- an illumination system IL, to condition a beam B of radiation. In this particular case, the illumination system also comprises a radiation source SO;
- a first object table (e.g., patterning device table) MT provided with a patterning device holder to hold a patterning device MA (e.g., a reticle), and connected to a first positioner to accurately position the patterning device with respect to item PS;
- a second object table (substrate table) WT provided with a substrate holder to hold a substrate W (e.g., a resist-coated silicon wafer), and connected to a second positioner to accurately position the substrate with respect to item PS;
- a projection system ("lens") PS (e.g., a refractive, catoptric or catadioptric optical system) to image an irradiated portion of the patterning device MA onto a target portion C (e.g., comprising one or more dies) of the substrate W.

As depicted herein, the apparatus is of a transmissive type (i.e., has a transmissive patterning device). However, in general, it may also be of a reflective type, for example (with a reflective patterning device). The apparatus may employ a different kind of patterning device to classic mask; examples include a programmable mirror array or LCD matrix.

The source SO (e.g., a mercury lamp or excimer laser, LPP (laser produced plasma) EUV source) produces a beam of radiation. This beam is fed into an illumination system (illuminator) IL, either directly or after having traversed conditioning means, such as a beam expander Ex, for example. The illuminator IL may comprise adjusting means AD for setting the outer and/or inner radial extent (commonly referred to as σ-outer and σ-inner, respectively) of the intensity distribution in the beam. In addition, it will generally comprise various other components, such as an integrator IN and a condenser CO. In this way, the beam B impinging on the patterning device MA has a desired uniformity and intensity distribution in its cross-section.

It should be noted with regard to FIG. 10 that the source SO may be within the housing of the lithographic projection apparatus (as is often the case when the source SO is a mercury lamp, for example), but that it may also be remote from the lithographic projection apparatus, the radiation beam that it produces being led into the apparatus (e.g., with the aid of suitable directing mirrors); this latter scenario is often the case when the source SO is an excimer laser (e.g., based on KrF, ArF or $F_2$ lasing).

The beam PB subsequently intercepts the patterning device MA, which is held on a patterning device table MT. Having traversed the patterning device MA, the beam B passes through the lens PL, which focuses the beam B onto a target portion C of the substrate W. With the aid of the second positioning means (and interferometric measuring means IF), the substrate table WT can be moved accurately, e.g. so as to position different target portions C in the path of the beam PB. Similarly, the first positioning means can be used to accurately position the patterning device MA with respect to the path of the beam B, e.g., after mechanical retrieval of the patterning device MA from a patterning device library, or during a scan. In general, movement of the object tables MT, WT will be realized with the aid of a long-stroke module (coarse positioning) and a short-stroke module (fine positioning), which are not explicitly depicted in FIG. 10. However, in the case of a stepper (as opposed to a step-and-scan tool) the patterning device table MT may just be connected to a short stroke actuator, or may be fixed.

The depicted tool can be used in two different modes:

In step mode, the patterning device table MT is kept essentially stationary, and an entire patterning device image is projected in one go (i.e., a single "flash") onto a target portion C. The substrate table WT is then shifted in the x and/or y directions so that a different target portion C can be irradiated by the beam PB;

In scan mode, essentially the same scenario applies, except that a given target portion C is not exposed in a single "flash". Instead, the patterning device table MT is movable in a given direction (the so-called "scan direction", e.g., the y direction) with a speed v, so that the projection beam B is caused to scan over a patterning device image; concurrently, the substrate table WT is simultaneously moved in the same or opposite direction at a speed V=Mv, in which M is the magnification of the lens PL (typically, M=¼ or ⅕). In this manner, a relatively large target portion C can be exposed, without having to compromise on resolution.

Figure 11:
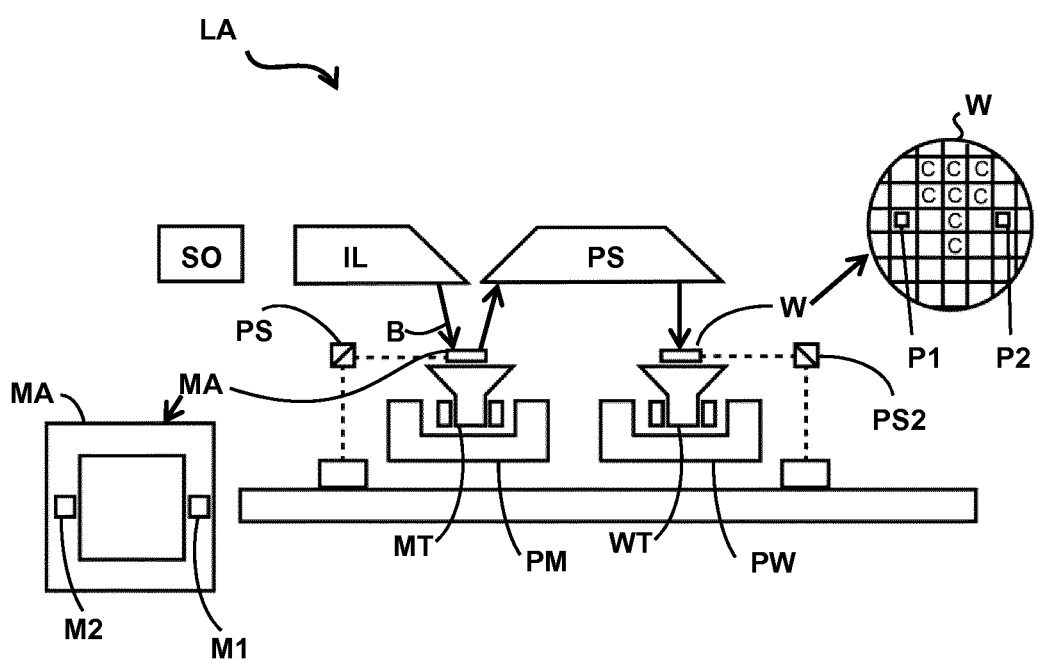
FIG. 11 is a schematic diagram of another lithographic projection apparatus, according to an embodiment.

FIG. 11 schematically depicts another exemplary lithographic projection apparatus LA in conjunction with the techniques described herein can be utilized.

The lithographic projection apparatus LA comprises:
a source collector module SO
an illumination system (illuminator) IL configured to condition a radiation beam B (e.g. EUV radiation).
support structure (e.g. a patterning device table) MT constructed to support a patterning device (e.g. a mask or a reticle) MA and connected to a first positioner PM configured to accurately position the patterning device;
a substrate table (e.g. a wafer table) WT constructed to hold a substrate (e.g. a resist coated wafer) W and connected to a second positioner PW configured to accurately position the substrate; and
a projection system (e.g. a reflective projection system) PS configured to project a pattern imparted to the radiation beam B by patterning device MA onto a target portion C (e.g. comprising one or more dies) of the substrate W.

As here depicted, the apparatus LA is of a reflective type (e.g. employing a reflective patterning device). It is to be noted that because most materials are absorptive within the EUV wavelength range, the patterning device may have multilayer reflectors comprising, for example, a multi-stack of Molybdenum and Silicon. In one example, the multi-stack reflector has a 40 layer pairs of Molybdenum and Silicon where the thickness of each layer is a quarter wavelength. Even smaller wavelengths may be produced with X-ray lithography. Since most material is absorptive at EUV and x-ray wavelengths, a thin piece of patterned absorbing material on the patterning device topography (e.g., a TaN absorber on top of the multi-layer reflector) defines where features would print (positive resist) or not print (negative resist).

Referring to FIG. 11, the illuminator IL receives an extreme ultra violet radiation beam from the source collector module SO. Methods to produce EUV radiation include, but are not necessarily limited to, converting a material into a plasma state that has at least one element, e.g., xenon, lithium or tin, with one or more emission lines in the EUV range. In one such method, often termed laser produced plasma ("LPP") the plasma can be produced by irradiating a fuel, such as a droplet, stream or cluster of material having the line-emitting element, with a laser beam. The source collector module SO may be part of an EUV radiation system including a laser, not shown in FIG. 11, for providing the laser beam exciting the fuel. The resulting plasma emits output radiation, e.g., EUV radiation, which is collected using a radiation collector, disposed in the source collector module. The laser and the source collector module may be separate entities, for example when a CO2 laser is used to provide the laser beam for fuel excitation.

In such cases, the laser is not considered to form part of the lithographic apparatus and the radiation beam is passed from the laser to the source collector module with the aid of a beam delivery system comprising, for example, suitable directing mirrors and/or a beam expander. In other cases the source may be an integral part of the source collector module, for example when the source is a discharge produced plasma EUV generator, often termed as a DPP source.

The illuminator IL may comprise an adjuster for adjusting the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL may comprise various other components, such as facetted field and pupil minor devices. The illuminator may be used to condition the radiation beam, to have a desired uniformity and intensity distribution in its cross section.

The radiation beam B is incident on the patterning device (e.g., mask) MA, which is held on the support structure (e.g., patterning device table) MT, and is patterned by the patterning device. After being reflected from the patterning device (e.g. mask) MA, the radiation beam B passes through the projection system PS, which focuses the beam onto a target portion C of the substrate W. With the aid of the second positioner PW and position sensor PS2 (e.g. an interferometric device, linear encoder or capacitive sensor), the substrate table WT can be moved accurately, e.g. so as to position different target portions C in the path of the radiation beam B. Similarly, the first positioner PM and another position sensor PS1 can be used to accurately position the patterning device (e.g. mask) MA with respect to the path of the radiation beam B. Patterning device (e.g. mask) MA and substrate W may be aligned using patterning device alignment marks M1, M2 and substrate alignment marks P1, P2.

The depicted apparatus LA could be used in at least one of the following modes:

1. In step mode, the support structure (e.g. patterning device table) MT and the substrate table WT are kept essentially stationary, while an entire pattern imparted to the radiation beam is projected onto a target portion C at one time (i.e. a single static exposure). The substrate table WT is then shifted in the X and/or Y direction so that a different target portion C can be exposed.

2. In scan mode, the support structure (e.g. patterning device table) MT and the substrate table WT are scanned synchronously while a pattern imparted to the radiation beam is projected onto a target portion C (i.e. a single dynamic exposure). The velocity and direction of the substrate table WT relative to the support structure (e.g. patterning device table) MT may be determined by the (de-)magnification and image reversal characteristics of the projection system PS.

3. In another mode, the support structure (e.g. patterning device table) MT is kept essentially stationary holding a programmable patterning device, and the substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable minor array of a type as referred to above.

Figure 12:
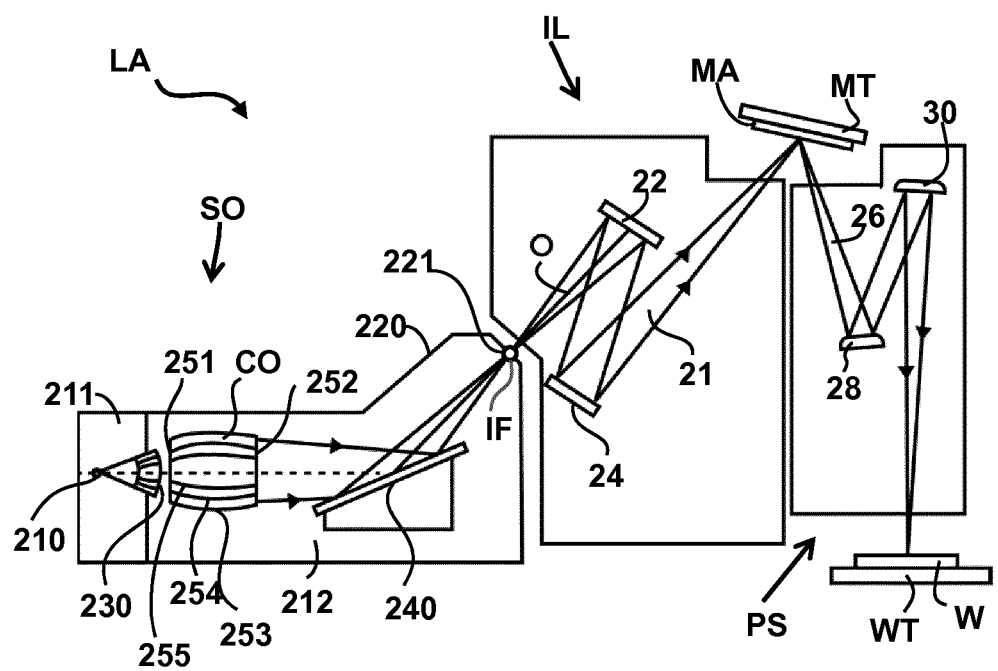
FIG. 12 is a more detailed view of the apparatus in FIG. 10, according to an embodiment.

FIG. 12 shows the apparatus LA in more detail, including the source collector module SO, the illumination system IL, and the projection system PS. The source collector module SO is constructed and arranged such that a vacuum environment can be maintained in an enclosing structure 220 of the source collector module SO. An EUV radiation emitting plasma 210 may be formed by a discharge produced plasma source. EUV radiation may be produced by a gas or vapor, for example Xe gas, Li vapor or Sn vapor in which the very hot plasma 210 is created to emit radiation in the EUV range of the electromagnetic spectrum. The very hot plasma 210 is created by, for example, an electrical discharge causing at least partially ionized plasma. Partial pressures of, for example, 10 Pa of Xe, Li, Sn vapor or any other suitable gas or vapor may be required for efficient generation of the radiation. In an embodiment, a plasma of excited tin (Sn) is provided to produce EUV radiation.

The radiation emitted by the hot plasma 210 is passed from a source chamber 211 into a collector chamber 212 via an optional gas barrier or contaminant trap 230 (in some cases also referred to as contaminant barrier or foil trap) which is positioned in or behind an opening in source chamber 211. The contaminant trap 230 may include a channel structure. Contamination trap 230 may also include a gas barrier or a combination of a gas barrier and a channel structure. The contaminant trap or contaminant barrier 230 further indicated herein at least includes a channel structure, as known in the art.

The collector chamber 211 may include a radiation collector CO which may be a so-called grazing incidence collector. Radiation collector CO has an upstream radiation collector side 251 and a downstream radiation collector side 252. Radiation that traverses collector CO can be reflected off a grating spectral filter 240 to be focused in a virtual source point IF along the optical axis indicated by the dot-dashed line 'O'. The virtual source point IF is commonly referred to as the intermediate focus, and the source collector module is arranged such that the intermediate focus IF is located at or near an opening 221 in the enclosing structure 220. The virtual source point IF is an image of the radiation emitting plasma 210.

Subsequently the radiation traverses the illumination system IL, which may include a facetted field mirror device 22 and a facetted pupil mirror device 24 arranged to provide a desired angular distribution of the radiation beam 21, at the patterning device MA, as well as a desired uniformity of radiation intensity at the patterning device MA. Upon reflection of the beam of radiation 21 at the patterning device MA, held by the support structure MT, a patterned beam 26 is formed and the patterned beam 26 is imaged by the projection system PS via reflective elements 28, 30 onto a substrate W held by the substrate table WT.

More elements than shown may generally be present in illumination optics unit IL and projection system PS. The grating spectral filter 240 may optionally be present, depending upon the type of lithographic apparatus. Further, there may be more mirrors present than those shown in the figures, for example there may be 1-6 additional reflective elements present in the projection system PS than shown in FIG. 12.

Collector optic CO, as illustrated in FIG. 12, is depicted as a nested collector with grazing incidence reflectors 253, 254 and 255, just as an example of a collector (or collector mirror). The grazing incidence reflectors 253, 254 and 255 are disposed axially symmetric around the optical axis O and a collector optic CO of this type may be used in combination with a discharge produced plasma source, often called a DPP source.

Figure 13:
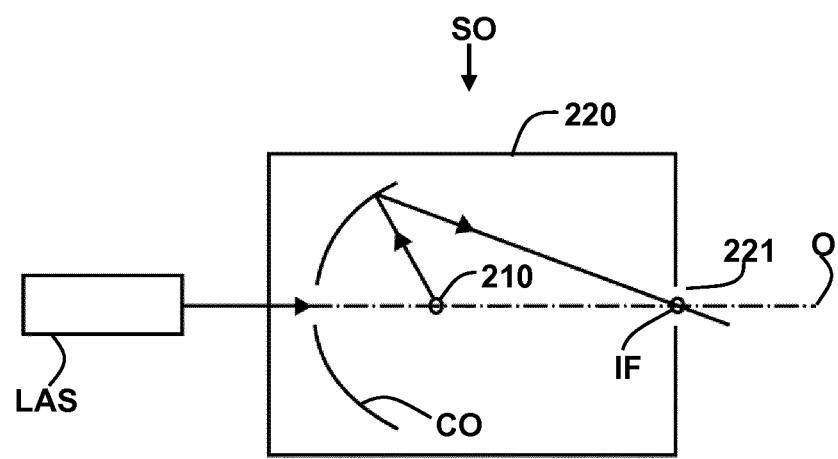
FIG. 13 is a more detailed view of the source collector module SO of the apparatus of FIG. 11 and FIG. 12, according to an embodiment.

Alternatively, the source collector module SO may be part of an LPP radiation system as shown in FIG. 13. A laser LAS is arranged to deposit laser energy into a fuel, such as xenon (Xe), tin (Sn) or lithium (Li), creating the highly ionized plasma 210 with electron temperatures of several 10's of eV. The energetic radiation generated during de-excitation and recombination of these ions is emitted from the plasma, collected by a near normal incidence collector optic CO and focused onto the opening 221 in the enclosing structure 220.

The embodiments may further be described using the following clauses:

1. A method to determine a curvilinear pattern of a patterning device, the method comprising:
obtaining (i) an initial image of the patterning device corresponding to a target pattern to be printed on a substrate subjected to a patterning process, and (ii) a process model configured to predict a pattern on the substrate from the initial image;
generating, by a hardware computer system, an enhanced image from the initial image;
generating, by the hardware computer system, a level set image using the enhanced image; and
iteratively determining, by the hardware computer system, a curvilinear pattern for the patterning device based on the level set image, the process model, and a cost function, wherein the cost function determines a difference between a predicted pattern and the target pattern, wherein the difference is iteratively reduced.

2. The method of clause 1, wherein the generating the enhanced image comprises:
selecting pixels with relatively low intensities compared to an average intensity of pixels throughout the initial image;
amplifying intensities of the selected pixels of the initial image; and
combining the intensities of the selected pixels with the intensities of pixels in the initial image to generate the enhanced image.

3. The method of any of clauses 1-2, wherein the amplifying intensities of the pixels of the initial image is based on an image processing operation comprising an edge detection filter.

4. The method of any of clauses 2-3, wherein the selected pixels correspond to a first order, a second order, a third order, and/or a fourth order sub-resolution assist feature, wherein the second order sub-resolution assist feature is an assist feature located at a greater distance from features corresponding to the target pattern than the first order sub-resolution feature.

5. The method of any of clauses 1-4, wherein the generation of the enhanced image further comprises:
filtering out noise from the enhanced image; and
performing a smoothing operation on the enhanced image.

6. The method of any of clauses 1-5, wherein the generating the curvilinear pattern further comprises:
converting the enhanced image to level set image.

7. The method of any of clauses 1-6, wherein an iteration of determining the curvilinear pattern comprises:
modifying mask variables corresponding to the level set image;
tracing a contour on a threshold plane that intersects the level set image, the contour corresponds to the curvilinear pattern;
determining a gradient of the cost function; and
optimizing the values of the mask variables of the level set image based on the gradient of the cost function such that the cost function is reduced.

8. The method of any of clauses 1-7, wherein the cost function is minimized.

9. The method of clause 8, wherein the cost function includes edge placement error, sidelobe printing penalty, and/or a mask rule check violation penalty.

10. The method of any of clauses 1-5, further comprising:
performing, by the hardware computer system, a patterning step using the curvilinear mask to print patterns on the substrate via the patterning process.

11. The method of any of clauses 1-10, wherein the initial image is a continuous transmission mask image comprising features corresponding to the target pattern and assist features.

12. The method of any of clauses 1-11, further comprising:
manufacturing the patterning device including structural features corresponding to the curvilinear pattern.

13. The method of clause 12, wherein the structural features correspond to optical proximity corrections including assist features and/or contour modification.

14. The method of clause 12, further comprising transferring, via a lithographic apparatus, the curvilinear pattern of the patterning device to the substrate.

15. A method to determine a curvilinear pattern of a patterning device, the method comprising:
obtaining (i) an initial image of the patterning device corresponding to a target pattern to be printed on a substrate subjected to a patterning process, and (ii) a process model configured to predict a pattern on the substrate from the initial image;
generating, by a hardware computer system, a transformed image by applying a binary transformation from the initial image as continuous mask image; and
iteratively determining, by the hardware computer system, a curvilinear pattern for the patterning device based on the transformed image, the process model, and a cost function, wherein the cost function determines a difference between a predicted pattern and the target pattern, wherein the difference is iteratively reduced.

16. The method clause 15, wherein an iteration of determining the curvilinear pattern comprises:
modifying mask variables corresponding to the initial image of the transformed image;
determining a gradient of the cost function; and
determining values of the mask variables of the level set image based on the gradient of the cost function such that the cost function is reduced.

17. The method of any of clauses 15-16, wherein the cost function is minimized.

18. The method of clause 17, wherein the cost function includes an edge placement error, sidelobe printing penalty, and/or a mask rule check violation penalty.

19. The method of any of clauses 1-18, further comprising:
generating, by the hardware computer system, an enhanced image from the initial image; generating, by the hardware computer system, a transformed image by applying a binary transformation to the enhanced image as continuous mask image; and
iteratively determining, by the hardware computer system, a curvilinear pattern for the patterning device based on the transformed image, the process model, and the cost function such that the cost function is reduced.

20. The method of any of clauses 1-19, wherein the binary transformation is performed by a logistic function, a step function, and/or a sigmoid function.

21. The method of any of clauses 15-20, further comprising:
performing a patterning step using the curvilinear mask to print patterns on the substrate via the patterning process.

22. The method of any of clauses 15-21, wherein the initial image is a continuous transmission mask image comprising features corresponding to the target pattern and sub-resolution assist features.

23. The method of any of clauses 15-22, further comprising:
incorporating structural features corresponding to the curvilinear pattern for fabricating the patterning device.

24. A computer program product comprising a non-transitory computer readable medium having instructions recorded thereon, the instructions when executed by a computer implementing the method of any of the above clauses.

The concepts disclosed herein may simulate or mathematically model any generic imaging system for imaging sub wavelength features, and may be especially useful with emerging imaging technologies capable of producing increasingly shorter wavelengths. Emerging technologies already in use include EUV (extreme ultra violet), DUV lithography that is capable of producing a 193 nm wavelength with the use of an ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range.

While the concepts disclosed herein may be used for imaging on a substrate such as a silicon wafer, it shall be understood that the disclosed concepts may be used with any type of lithographic imaging systems, e.g., those used for imaging on substrates other than silicon wafers.

The descriptions above are intended to be illustrative, not limiting. Thus, it will be apparent to one skilled in the art that modifications may be made as described without departing from the scope of the claims set out below.

What is claimed is:

1. A method to determine a curvilinear pattern of a patterning device, the method comprising:
obtaining (i) an initial non-level set image of the patterning device corresponding to a target pattern to be printed on a substrate subjected to a patterning process, and (ii) a process model configured to predict a pattern on the substrate from the initial non-level set image;
generating, by a hardware computer system, an enhanced image from the initial non-level set image;
generating, by the hardware computer system, a level set image using the enhanced image; and
iteratively determining, by the hardware computer system, a curvilinear pattern for the patterning device based on the level set image, the process model, and a cost function, wherein the cost function determines a difference between a predicted pattern and the target pattern and wherein the difference is iteratively reduced.

2. The method of claim 1, wherein the generating the enhanced image comprises:
selecting pixels with relatively low intensities compared to an average intensity of pixels throughout the initial non-level set image;
amplifying intensities of the selected pixels of the initial non-level set image; and
combining the amplified intensities of the selected pixels with the intensities of pixels in the initial non-level set image to generate the enhanced image.

3. The method of claim 2, wherein the amplifying intensities of the selected pixels of the initial non-level set image is based on an image processing operation comprising an edge detection filter.

4. The method of claim 2, wherein the selected pixels correspond to a first order, a second order, a third order, and/or a fourth order sub-resolution assist feature, wherein the second order sub-resolution assist feature is an assist feature located at a greater distance from features corresponding to the target pattern than the first order sub-resolution feature.

5. The method of claim 1, wherein the generating the enhanced image further comprises:
filtering out noise from the enhanced image; and
performing a smoothing operation on the enhanced image.

6. The method of claim 1, further comprising converting the enhanced image to the level set image.

7. The method of claim 1, wherein an iteration of determining the curvilinear pattern comprises:
tracing a contour on a threshold plane that intersects the level set image, the contour corresponding to the curvilinear pattern;
determining a gradient of the cost function; and
optimizing a value of one or more patterning device variables corresponding to the level set image based on the gradient of the cost function such that the cost function is reduced.

8. The method of claim 1, wherein the cost function is minimized.

9. The method of claim 8, wherein the cost function includes edge placement error, a sidelobe printing penalty, and/or a mask rule check violation penalty.

10. The method of claim 1, further comprising performing a patterning step using a patterning device configured to impart radiation with the curvilinear pattern to print patterns via the patterning process.

11. The method of claim 1, wherein the initial non-level set image is a continuous transmission mask image comprising features corresponding to the target pattern and assist features.

12. The method of claim 1, further comprising manufacturing a patterning device including structural features corresponding to the curvilinear pattern.

13. The method of claim 12, wherein the structural features correspond to optical proximity corrections including assist features and/or contour modification.

14. The method of claim 12, further comprising transferring, via a lithographic apparatus, the curvilinear pattern of the patterning device to a substrate.

15. A computer program product comprising a non-transitory computer readable medium having instructions therein, the instructions, when executed by a computer system, configured to cause the computer system to at least:
obtain (i) an initial non-level set image of the patterning device corresponding to a target pattern to be printed on a substrate subjected to a patterning process, and (ii) a process model configured to predict a pattern on the substrate from the initial non-level set image;
generate an enhanced image from the initial non-level set image;
generate a level set image using the enhanced image; and
iteratively determine a curvilinear pattern for the patterning device based on the level set image, the process model, and a cost function, wherein the cost function determines a difference between a predicted pattern and the target pattern and wherein the difference is iteratively reduced.

16. The computer program product of claim 15, wherein the instructions configured to cause the computer system to generate the enhanced image are further configured to cause the computer system to:
select pixels with relatively low intensities compared to an average intensity of pixels throughout the initial non-level set image;
amplify intensities of the selected pixels of the initial non-level set image; and
combine the amplified intensities of the selected pixels with the intensities of pixels in the initial non-level set image to generate the enhanced image.

17. The computer program product of claim 15, wherein the instructions configured to cause the computer system to generate the enhanced image are further configured to cause the computer system to:
filter out noise from the enhanced image; and
perform a smoothing operation on the enhanced image.

18. The computer program product of claim 15, wherein the instructions are further configured to cause the computer system to convert the enhanced image to the level set image.

19. The computer program product of claim 15, wherein the instructions configured to cause the computer system to iteratively determine the curvilinear pattern are further configured to cause the computer system to, for an iteration of determining the curvilinear pattern:
trace a contour on a threshold plane that intersects the level set image, the contour corresponding to the curvilinear pattern;
determine a gradient of the cost function; and optimize a value of one or more patterning device variables corresponding to the level set image based on the gradient of the cost function such that the cost function is reduced.

20. The computer program product of claim 15, wherein the initial image is a continuous transmission mask image comprising features corresponding to the target pattern and assist features.

* * * * *

UNITED STATES PATENT AND TRADEMARK OFFICE
CERTIFICATE OF CORRECTION

PATENT NO. : 11,232,249 B2
APPLICATION NO. : 16/976492
DATED : January 25, 2022
INVENTOR(S) : Quan Zhang et al.

Page 1 of 1

It is certified that error appears in the above-identified patent and that said Letters Patent is hereby corrected as shown below:

On the Title Page

On page 2, item (56) References Cited:
Delete "2017/0336713, 02/2017, ASML Netherlands B.V." and insert -- 2017/0336713, 11/2017, ASML Netherlands B.V. --, in U.S. Patent Documents Signed and Sealed this
Twelfth Day of July, 2022

Katherine Kelly Vidal
*Director of the United States Patent and Trademark Office*